(12) United States Patent
Mailman

(10) Patent No.: US 6,232,956 B1
(45) Date of Patent: May 15, 2001

(54) OHAI TECHNOLOGY USER INTERFACE

(75) Inventor: Daniel S. Mailman, Houston, TX (US)

(73) Assignee: Spice Technologies, Inc., Houston, TX (US)

( * ) Notice: Subject to any disclaimer, the term of this patent is extended or adjusted under 35 U.S.C. 154(b) by 0 days.

(21) Appl. No.: 09/031,663

(22) Filed: Feb. 27, 1998

Related U.S. Application Data

(60) Provisional application No. 60/039,390, filed on Feb. 27, 1997.

(51) Int. Cl.$^7$ ........................................ G09G 5/00
(52) U.S. Cl. .................... 345/156; 345/146; 345/163; 345/168; 345/171; 341/21; 341/28; 400/484
(58) Field of Search .................. 345/156, 161, 345/162, 168, 169, 171, 172, 7, 8, 17, 352–354, 146, 173, 163; 341/20, 21, 28; 400/484

(56) References Cited

U.S. PATENT DOCUMENTS

| | | |
|---|---|---|
| 3,809,203 | 5/1974 | Ogawa et al. . |
| 3,809,204 | 5/1974 | Ogawa . |
| 3,929,216 | 12/1975 | Einbinder . |
| 4,096,934 | 6/1978 | Kirmser . |
| 4,294,550 | 10/1981 | Wang . |
| 4,360,892 * | 11/1982 | Endfield . |
| 4,414,537 * | 11/1983 | Grimes ..................................... 341/20 |
| 4,443,789 * | 4/1984 | Endfield et al. ........................ 341/22 |
| 4,458,238 * | 7/1984 | Learn ..................................... 341/20 |
| 4,462,703 | 7/1984 | Lee . |
| 4,484,305 | 11/1984 | Ho . |
| 4,490,056 | 12/1984 | Whitaker . |
| 4,516,939 | 5/1985 | Crimmins, Jr. . |
| 4,517,484 | 5/1985 | Dacier . |
| 4,523,060 | 6/1985 | Maguire . |
| 4,602,878 * | 7/1986 | Merner et al. ........................ 400/110 |
| 4,638,306 * | 1/1987 | Rollhaus et al. ........................ 341/28 |
| 5,047,932 * | 9/1991 | Hsieh .................................... 364/419 |

(List continued on next page.)

FOREIGN PATENT DOCUMENTS

95/32461 * 11/1995 (WO) .

Primary Examiner—Richard A. Hjerpe
Assistant Examiner—Henry N. Tran
(74) Attorney, Agent, or Firm—Wendy K. Buskop; Buskop Law Group

(57) ABSTRACT

A variety of methods and systems for presenting and delivering user application input choices. One-handed or vocal user input provides chords or syllables. The invention includes systems and methods for presenting user application input choices, chord or syllable based apparatus and sub-systems for generating user application input choices in response to input signals associated with chords or syllables. One embodiment of input device resembles a joystick and includes a base and a key carrier extending from the base. A single key is provided along the top of the carrier, and four keys extend widthwise along a side surface. A system presents and delivers user application input choices. An input device receives chords and syllables. A processor associated with the input device receives chords or syllables and generates input signals, a second processor for receiving and evaluating the input signals and for sending a user application signal to the user application processor of the computer.

17 Claims, 54 Drawing Sheets

U.S. PATENT DOCUMENTS

| | | | | |
|---|---|---|---|---|
| 5,087,910 | * | 2/1992 | Guyot-Sionnest | 345/169 |
| 5,189,416 | | 2/1993 | Estes . | |
| 5,212,638 | * | 5/1993 | Bernath | 364/419 |
| 5,213,422 | | 5/1993 | Garfinkle . | |
| 5,281,957 | * | 1/1994 | Schoolman | 345/8 |
| 5,410,306 | * | 4/1995 | Ye | 341/28 |
| 5,432,510 | * | 7/1995 | Matthews | 341/20 |
| 5,493,654 | * | 2/1996 | Gopher et al. | 341/22 |
| 5,515,305 | * | 5/1996 | Register et al. | 708/145 |
| 5,648,798 | * | 7/1997 | Hamling | 345/163 |
| 5,808,567 | * | 9/1998 | McCloud | 341/20 |
| 5,847,697 | * | 12/1998 | Sugimoto | 345/168 |
| 5,900,864 | * | 5/1999 | Macdonald | 345/172 |
| 5,936,556 | * | 8/1999 | Sakita | 341/28 |
| 6,005,498 | * | 12/1999 | Yang et al. | 341/23 |
| 6,005,549 | * | 12/1999 | Forest | 345/157 |
| 6,014,615 | * | 1/2000 | Chen | 704/3 |

* cited by examiner

| LOWER | space | a | b |
|---|---|---|---|
| c | d | e | f |
| g | h | i | j |
| k | l | m | n |
| o | p | q | r |
| s | t | u | v |
| w | x | y | z |
| UPPER | NUMBER | PUNCT | backspace |

| UPPER | space | A | B |
|---|---|---|---|
| C | D | E | F |
| G | H | I | J |
| K | L | M | N |
| O | P | Q | R |
| S | T | U | V |
| W | X | Y | Z |
| CAPLOCK | NUMBER | PUNCT | LOWER |

| CAPLOCK | space | A | B |
|---|---|---|---|
| C | D | E | F |
| G | H | I | J |
| K | L | M | N |
| O | P | Q | R |
| S | T | U | V |
| W | X | Y | Z |
| LOWER | NUMBER | PUNCT | backspace |

| NUMBER | . | , | 0 |
|---|---|---|---|
| 1 | 2 | 3 | 4 |
| 5 | 6 | 7 | 8 |
| 9 | ( | ) | \| |
| + | - | * | / |
| % | = | < | > |
| [ | ] | { | } |
| UPPER | NUMLOCK | PUNCT | LOWER |

| NUMLOCK | . | , | 0 |
|---|---|---|---|
| 1 | 2 | 3 | 4 |
| 5 | 6 | 7 | 8 |
| 9 | ( | ) | \| |
| + | - | * | / |
| % | = | < | > |
| [ | ] | { | } |
| UPPER | LOWER | PUNCT | backspace |

| PUNCT | . | , | ? |
|---|---|---|---|
| ; | : | " | ' |
| ! | @ | # | & |
| \ | ( | ) | ^ |
| ~ | - | * | / |
| $ | = | _ | ` |
| [ | ] | { | } |
| UPPER | NUMBER |  | LOWER |

Fig. 10

| Grid Name | Primary Task | Other Tasks |
|---|---|---|
| LOWER | Input spaces and lowercase letters | Backspace<br>Select Grids for LOWER, NUMBER, PUNCT |
| UPPER | Input a single uppercase letter and return to lower case input | Set CAPLOCK<br>Select Grids for LOWER, NUMBER, PUNCT<br>Input a space and return to lower case input |
| NUMBER | Input a single number or math symbol and return to lower case input | Set NUMLOCK<br>Select Grids for LOWER, UPPER, PUNCT |
| PUNCT | Input a series of uppercase letters or spaces | Select Grids for LOWER, UPPER, NUMBER |
| CAPLOCK | Input a series of uppercase letters or spaces | Backspace<br>Select Grids for LOWER, NUMBER, PUNCT |
| NUMLOCK | Input series of numbers or math symbols | Backspace<br>Select Grids for LOWER, UPPER, PUNCT |

Fig. 11

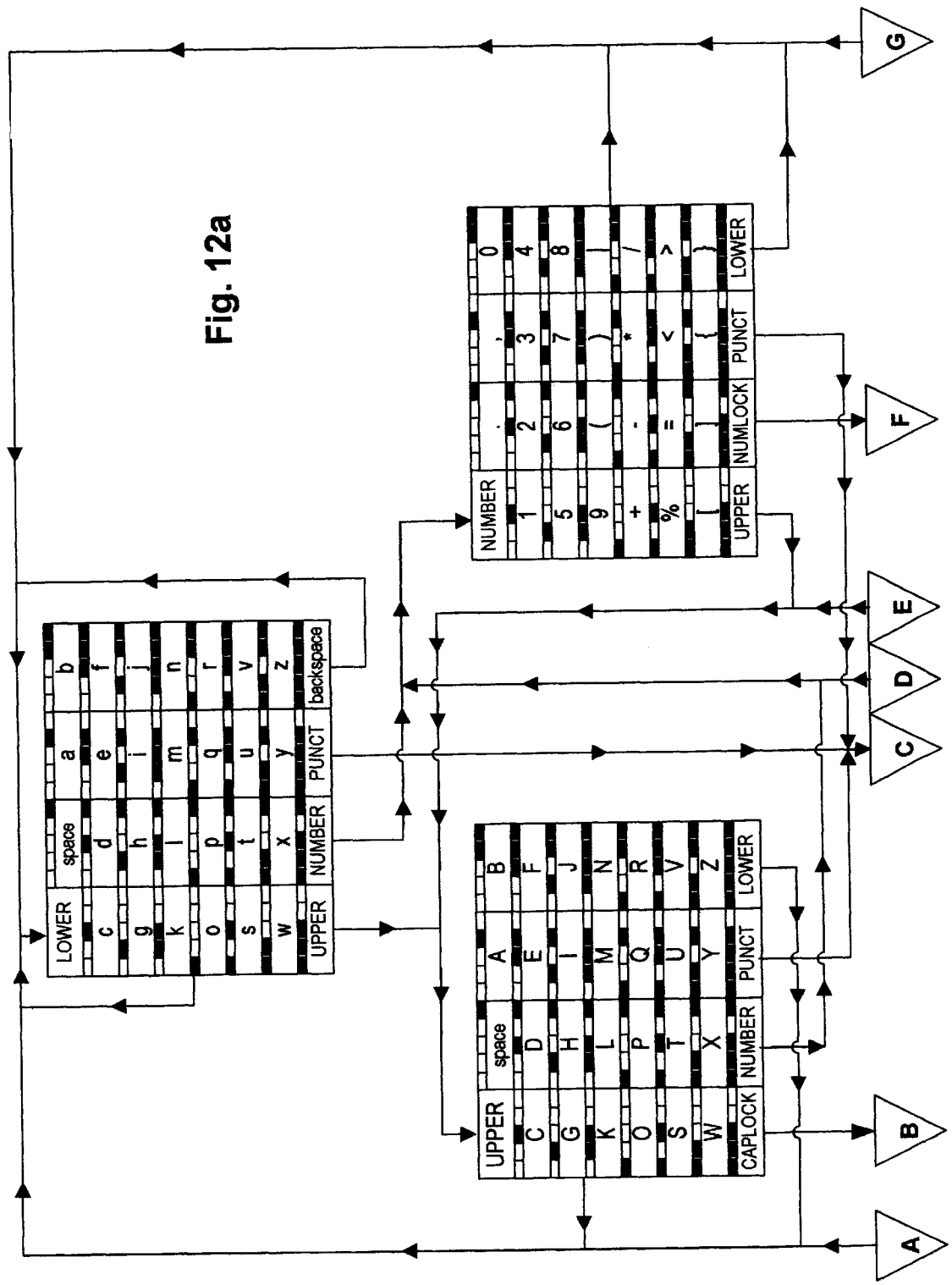

"the OHAI handset"

| OHAI Chord | (Sub) Input | Application Window | Keyboard Keystrokes |
|---|---|---|---|
| 00000 | | | |
| 10305 | t | | t |
| 02005 | h | | h |
| 00340 | e | Word Processor<br>the | e |
| 00005 | space | | |
| 12300 | UPPER | | |

OHAI Window

| LOWER | space | a | b |
| c | d | e | f |
| g | h | i | j |
| k | l | m | n |
| o | p | q | r |
| s | t | u | v |
| w | x | y | z |
| UPPER | NUMBER | PUNCT | backspace |

| UPPER | space | A | B |
| C | D | E | F |
| G | H | I | J |
| K | L | M | N |
| O | P | Q | R |
| S | T | U | V |
| W | X | Y | Z |
| CAPLOCK | NUMBER | PUNCT | LOWER |

"the OHAI handset"

| OHAI Window | OHAI Chord | (Sub) Input | Application Window | Keyboard Keystrokes |
|---|---|---|---|---|
| | 12300 | CAPLOCK | | caplock |
| | 10000 | O | | O |
| | 02005 | H | | H |
| | 00040 | A | | A |
| | 02040 | I | Word Processor<br>the OHAI | I |
| | 12300 | LOWER | | caplock |
| | 00005 | space | | space |
| | 02005 | h | | h |
| | 00040 | a | | a |
| | 02345 | n | | n |
| | 00305 | d | | d |
| | 10300 | s | | s |
| | 00340 | e | | e |
| | 10305 | t | Word Processor<br>the OHAI handset | t |

Fig. 16a

| Vowel Clusters | Initials | | | | | | | | | | | |
|---|---|---|---|---|---|---|---|---|---|---|---|---|
| | ø | b | p | m | f | d | t | n | l | z | c | s |
| a | a | ba | pa | ma | fa | da | ta | na | la | za | ca | sa |
| o | o | bo | po | mo | fo | | | | | | | |
| e | e | | | me | | de | te | ne | le | ze | ce | se |
| -i | | | | | | | | | | zi | ci | si |
| er | er | | | | | | | | | | | |
| ai | ai | bai | pai | mai | | dai | tai | nai | lai | zai | cai | sai |
| ei | ei | bei | pei | mei | fei | dei | tai | nai | lai | zei | | |
| ao | ao | bao | pao | mao | | dao | tao | nao | lao | zao | cao | sao |
| ou | ou | | pou | mou | fou | dou | tou | nou | lou | zou | cou | sou |
| an | an | ban | pan | man | fan | dan | tan | nan | lan | zan | can | san |
| en | en | ben | pen | men | fen | den | | nen | | zen | cen | sen |
| ang | ang | bang | pang | mang | fang | dang | tang | nang | lang | zang | cang | sang |
| eng | ang | beng | peng | meng | feng | deng | teng | neng | leng | zeng | ceng | seng |
| ong | | | | | | dong | tong | nong | long | zong | cong | song |

Fig. 16b

| Vowel Clusters | Initials | | | | | | | | | | |
|---|---|---|---|---|---|---|---|---|---|---|---|
| | zh | ch | sh | r | j | q | x | g | k | h |
| a | zha | cha | sha | | | | | ga | ka | ha |
| o | | | | | | | | | | |
| e | zhe | che | she | re | | | | ge | ke | he |
| -i | zhi | chi | shi | ri | | | | | | |
| er | | | | | | | | | | |
| ai | zhai | chai | shai | | | | | gai | kai | hai |
| ei | | | shei | | | | | gei | kei | hei |
| ao | zhao | chao | shao | rao | | | | gao | kao | hao |
| ou | zhou | chou | shou | rou | | | | gou | kou | hou |
| an | zhan | chan | shan | ran | | | | gan | kan | han |
| en | zhen | chen | shen | ren | | | | gen | ken | hen |
| ang | zhang | chang | shang | rang | | | | gang | kang | hang |
| eng | zheng | cheng | sheng | reng | | | | geng | keng | heng |
| ong | zhong | chong | | rong | | | | gong | kong | hong |

| Vowel Clusters | Initials | | | | | | | | | | | |
|---|---|---|---|---|---|---|---|---|---|---|---|---|
| | ø | b | p | m | f | d | t | n | l | z | c | s |
| i | yi | bi | pi | mi | | di | ti | ni | li | | | |
| ia | ya | | | | | | | | lia | | | |
| ie | ye | bie | pie | mie | | die | tie | nie | lie | | | |
| iou | you | | | miu | | diu | | niu | liu | | | |
| ian | yan | bian | pian | mian | | dian | tian | nian | lian | | | |
| in | yin | bin | pin | min | | | | nin | lin | | | |
| iang | yang | | | | | | | niang | liang | | | |
| ing | ying | bing | ping | ming | | ding | ting | ning | ling | | | |
| iong | yong | | | | | | | | | | | |
| u | wu | bu | pu | mu | fu | du | tu | nu | lu | zu | cu | su |
| ua | wa | | | | | | | | | | | |
| uo | wo | | | | | duo | tuo | nuo | luo | zuo | cuo | suo |
| uai | wai | | | | | | | | | | | |
| uei | wei | | | | | dui | tui | | | zui | cui | sui |
| uan | wan | | | | | duan | tuan | nuan | luan | zuan | cuan | suan |
| uen | wen | | | | | dun | tuen | | lun | zun | cun | sun |
| uang | wang | | | | | | | | | | | |
| ueng | weng | | | | | | | | | | | |
| ü | yu | | | | | | | nü | lü | | | |
| üe | yue | | | | | | | nüe | lüe | | | |
| üan | yuan | | | | | | | | | | | |
| ün | yun | | | | | | | | | | | |

Fig. 16c

| Vowel Clusters | Initials | | | | | | | | | | |
|---|---|---|---|---|---|---|---|---|---|---|---|
| | zh | ch | sh | r | j | q | x | g | k | h |
| i | | | | | ji | qi | xi | | | |
| ia | | | | | jia | qia | xia | | | |
| ie | | | | | jie | qie | xie | | | |
| iou | | | | | jiu | qiu | xiu | | | |
| ian | | | | | jian | qian | xian | | | |
| in | | | | | jin | qin | xin | | | |
| iang | | | | | jiang | qiang | xiang | | | |
| ing | | | | | jing | qing | xing | | | |
| iong | | | | | jiong | qiong | xiong | | | |
| u | zhu | chu | shu | ru | | | | gu | ku | hu |
| ua | zhua | chua | shua | rua | | | | guo | kuo | huo |
| uo | zhuo | chuo | shuo | ruo | | | | guai | kuai | huai |
| uai | zhuai | chuai | shuai | | | | | gui | kui | hui |
| uei | zhui | chui | shui | rui | | | | guan | kuan | huan |
| uan | zhuan | chuan | shuan | ruan | | | | gun | kun | hun |
| uen | zhun | chun | shun | run | | | | guang | kuang | huang |
| uang | zhuang | chuang | shuang | | | | | | | |
| ueng | | | | | | | | | | |
| ü | | | | | ju | qu | xu | | | |
| üe | | | | | jue | que | xue | | | |
| üan | | | | | juan | quan | xuan | | | |
| ün | | | | | jun | qun | xun | | | |

| Vowel | Final | Initial Ø Tone 1 | Ø 2 | Ø 3 | Ø 4 | Ø Ø | b 1 | b 2 | b 3 | b 4 | b Ø | p 1 | p 2 | p 3 | p 4 | p Ø |
|---|---|---|---|---|---|---|---|---|---|---|---|---|---|---|---|---|
| a | Ø | 4 | 1 | 1 | 1 | 1 | 10 | 4 | 3 | 7 | 1 | 3 | 7 | 0 | 2 | 0 |
| a | n | 8 | 0 | 4 | 6 | 0 | 8 | 0 | 3 | 7 | 0 | 2 | 7 | 0 | 6 | 0 |
| a | ng | 1 | 1 | 0 | 1 | 0 | 4 | 0 | 3 | 7 | 0 | 3 | 7 | 2 | 1 | 0 |
| o | Ø | 2 | 1 | 1 | 1 | 0 | 8 | 19 | 2 | 5 | 1 | 6 | 3 | 3 | 6 | 1 |
| o | ng | | | | | | | | | | | | | | | |
| e | Ø | 3 | 9 | 1 | 18 | 0 | | | | | | | | | | |
| e | n | 2 | 0 | 0 | 1 | 0 | 3 | 0 | 3 | 2 | 0 | 1 | 1 | 0 | 1 | 0 |
| e | ng | | | | | | 3 | 1 | 1 | 6 | 0 | 5 | 10 | 1 | 1 | 0 |
| -i | Ø | | | | | | | | | | | | | | | |
| er | Ø | 0 | 3 | 7 | 2 | 0 | | | | | | | | | | |
| ai | Ø | 6 | 6 | 5 | 8 | 0 | 1 | 1 | 6 | 3 | 0 | 1 | 3 | 2 | 3 | 0 |
| ei | Ø | 1 | 1 | 1 | 1 | 0 | 6 | 0 | 1 | 14 | 2 | 2 | 5 | 0 | 7 | 0 |
| ao | Ø | 2 | 10 | 3 | 8 | 0 | 8 | 2 | 7 | 7 | 0 | 3 | 6 | 1 | 3 | 0 |
| ou | Ø | 6 | 0 | 4 | 2 | 0 | | | | | | 1 | 1 | 1 | 0 | 0 |
| i | Ø | 14 | 24 | 13 | 51 | 0 | 1 | 2 | 9 | 36 | 0 | 9 | 15 | 8 | 6 | 0 |
| i | n | 12 | 8 | 6 | 7 | 0 | 8 | 0 | 0 | 5 | 0 | 2 | 5 | 1 | 2 | 0 |
| i | ng | 11 | 15 | 4 | 4 | 0 | 4 | 0 | 7 | 3 | 0 | 2 | 9 | 0 | 0 | 0 |
| ia | Ø | 8 | 8 | 2 | 10 | 1 | | | | | | | | | | |
| ia | n | 13 | 15 | 9 | 18 | 0 | 8 | 0 | 5 | 12 | 0 | 6 | 4 | 1 | 2 | 0 |
| ia | ng | 5 | 9 | 4 | 4 | 0 | | | | | | | | | | |
| iao | Ø | 8 | 11 | 4 | 7 | 0 | 7 | 0 | 3 | 1 | 0 | 6 | 3 | 3 | 4 | 0 |
| ie | Ø | 5 | 3 | 3 | 13 | 0 | 3 | 2 | 1 | 1 | 0 | 3 | 0 | 2 | 0 | 0 |
| iou | Ø | 6 | 16 | 8 | 13 | 0 | | | | | | | | | | |
| io | ng | 11 | 1 | 11 | 2 | 0 | | | | | | | | | | |
| u | Ø | 8 | 9 | 10 | 18 | 0 | 1 | 1 | 6 | 9 | 0 | 4 | 8 | 10 | 3 | 0 |
| ua | Ø | 4 | 1 | 2 | 3 | 1 | | | | | | | | | | |
| ua | n | 5 | 6 | 12 | 4 | 0 | | | | | | | | | | |
| ua | ng | 1 | 4 | 7 | 5 | 0 | | | | | | | | | | |
| uo | Ø | 8 | 0 | 1 | 9 | 0 | | | | | | | | | | |
| uai | Ø | 2 | 0 | 1 | 1 | 0 | | | | | | | | | | |
| uei | Ø | 11 | 12 | 16 | 17 | 0 | | | | | | | | | | |
| ue | n | 4 | 4 | 5 | 3 | 0 | | | | | | | | | | |
| ue | ng | 3 | 0 | 1 | 3 | 0 | | | | | | | | | | |
| ü | Ø | 3 | 30 | 15 | 33 | 0 | | | | | | | | | | |
| ü | n | 2 | 6 | 3 | 10 | 0 | | | | | | | | | | |
| üe | Ø | 2 | 0 | 0 | 11 | 0 | | | | | | | | | | |
| üa | n | 4 | 19 | 1 | 5 | 0 | | | | | | | | | | |

Fig. 17b

| Vowel | Initial | m | m | m | m | m | f | f | f | f | f | d | d | d | d | d |
|---|---|---|---|---|---|---|---|---|---|---|---|---|---|---|---|---|
|  | Tone | 1 | 2 | 3 | 4 | Ø | 1 | 2 | 3 | 4 | Ø | 1 | 2 | 3 | 4 | Ø |
|  | Final |  |  |  |  |  |  |  |  |  |  |  |  |  |  |  |
| a | Ø | 5 | 4 | 6 | 2 | 2 | 1 | 6 | 2 | 2 | 0 | 6 | 7 | 1 | 1 | 2 |
| a | n | 1 | 7 | 2 | 8 | 0 | 5 | 7 | 2 | 7 | 0 | 7 | 0 | 3 | 11 | 0 |
| a | ng | 0 | 7 | 2 | 0 | 0 | 5 | 6 | 4 | 1 | 0 | 4 | 0 | 3 | 6 | 0 |
| o | Ø | 1 | 10 | 1 | 18 | 0 | 0 | 1 | 0 | 0 | 0 |  |  |  |  |  |
| o | ng |  |  |  |  |  |  |  |  |  |  | 4 | 0 | 2 | 8 | 0 |
| e | Ø | 0 | 0 | 0 | 0 | 1 |  |  |  |  |  | 0 | 3 | 0 | 0 | 3 |
| e | n | 1 | 3 | 0 | 3 | 1 | 6 | 5 | 1 | 6 | 0 | 0 | 0 | 0 | 1 | 0 |
| e | ng | 1 | 11 | 7 | 2 | 0 | 11 | 3 | 1 | 4 | 0 | 4 | 0 | 2 | 6 | 0 |
| -i | Ø |  |  |  |  |  |  |  |  |  |  |  |  |  |  |  |
| er | Ø |  |  |  |  |  |  |  |  |  |  |  |  |  |  |  |
| ai | Ø | 0 | 2 | 2 | 4 | 0 |  |  |  |  |  | 2 | 0 | 3 | 15 | 0 |
| ei | Ø | 0 | 15 | 3 | 7 | 0 | 10 | 3 | 8 | 9 | 0 | 0 | 0 | 1 | 0 | 0 |
| ao | Ø | 1 | 9 | 2 | 9 | 0 |  |  |  |  |  | 3 | 0 | 6 | 7 | 0 |
| ou | Ø | 1 | 5 | 1 | 0 | 0 | 0 | 0 | 2 | 0 | 0 | 2 | 0 | 4 | 6 | 0 |
| i | Ø | 2 | 10 | 5 | 9 | 0 |  |  |  |  |  | 7 | 12 | 6 | 12 | 0 |
| i | n | 0 | 1 | 8 | 0 | 0 |  |  |  |  |  |  |  |  |  |  |
| i | ng | 0 | 11 | 1 | 1 | 0 |  |  |  |  |  | 9 | 0 | 3 | 7 | 0 |
| ia | Ø |  |  |  |  |  |  |  |  |  |  |  |  |  |  |  |
| ia | n | 0 | 3 | 8 | 1 | 0 |  |  |  |  |  | 5 | 0 | 4 | 13 | 0 |
| ia | ng |  |  |  |  |  |  |  |  |  |  |  |  |  |  |  |
| iao | Ø | 1 | 4 | 7 | 3 | 0 |  |  |  |  |  | 7 | 0 | 0 | 5 | 0 |
| ie | Ø | 2 | 0 | 0 | 3 | 0 |  |  |  |  |  | 2 | 9 | 0 | 0 | 0 |
| iou | Ø | 0 | 0 | 0 | 2 | 0 |  |  |  |  |  | 2 | 0 | 0 | 0 | 0 |
| io | ng |  |  |  |  |  |  |  |  |  |  |  |  |  |  |  |
| u | Ø | 0 | 1 | 5 | 14 | 0 | 7 | 25 | 13 | 22 | 1 | 3 | 9 | 5 | 7 | 0 |
| ua | Ø |  |  |  |  |  |  |  |  |  |  |  |  |  |  |  |
| ua | n |  |  |  |  |  |  |  |  |  |  | 1 | 0 | 1 | 7 | 0 |
| ua | ng |  |  |  |  |  |  |  |  |  |  |  |  |  |  |  |
| uo | Ø |  |  |  |  |  |  |  |  |  |  | 4 | 4 | 3 | 7 | 0 |
| uai | Ø |  |  |  |  |  |  |  |  |  |  |  |  |  |  |  |
| uei | Ø |  |  |  |  |  |  |  |  |  |  | 1 | 0 | 0 | 6 | 0 |
| ue | n |  |  |  |  |  |  |  |  |  |  | 4 | 0 | 2 | 7 | 0 |
| ue | ng |  |  |  |  |  |  |  |  |  |  |  |  |  |  |  |
| ü | Ø |  |  |  |  |  |  |  |  |  |  |  |  |  |  |  |
| ü | n |  |  |  |  |  |  |  |  |  |  |  |  |  |  |  |
| üe | Ø |  |  |  |  |  |  |  |  |  |  |  |  |  |  |  |
| üa | n |  |  |  |  |  |  |  |  |  |  |  |  |  |  |  |

Fig. 17c

| Vowel | Initial<br>Tone<br>Final | z<br>1 | z<br>2 | z<br>3 | z<br>4 | z<br>Ø | c<br>1 | c<br>2 | c<br>3 | c<br>4 | c<br>Ø |
|---|---|---|---|---|---|---|---|---|---|---|---|
| a | Ø | 5 | 2 | 1 | 0 | 0 | 3 | 0 | 1 | 0 | 0 |
| a | n | 2 | 1 | 4 | 3 | 1 | 2 | 3 | 2 | 4 | 0 |
| a | ng | 3 | 0 | 1 | 3 | 0 | 5 | 1 | 0 | 0 | 0 |
| o | Ø | | | | | | | | | | |
| o | ng | 5 | 0 | 2 | 2 | 0 | 8 | 4 | 0 | 0 | 0 |
| e | Ø | 0 | 9 | 0 | 1 | 0 | 0 | 0 | 0 | 7 | 0 |
| e | n | 0 | 0 | 1 | 1 | 0 | 1 | 2 | 0 | 0 | 0 |
| e | ng | 5 | 0 | 0 | 4 | 0 | 0 | 2 | 0 | 1 | 0 |
| -i | Ø | 17 | 0 | 9 | 5 | 0 | 4 | 10 | 1 | 4 | 0 |
| er | Ø | | | | | | | | | | |
| ai | Ø | 4 | 0 | 4 | 3 | 0 | 1 | 4 | 4 | 3 | 0 |
| ei | Ø | 0 | 2 | 0 | 0 | 0 | | | | | |
| ao | Ø | 2 | 1 | 5 | 8 | 0 | 2 | 5 | 1 | 0 | 0 |
| ou | Ø | 2 | 0 | 1 | 2 | 0 | 0 | 0 | 0 | 2 | 0 |
| i | Ø | | | | | | | | | | |
| i | n | | | | | | | | | | |
| i | ng | | | | | | | | | | |
| ia | Ø | | | | | | | | | | |
| ia | n | | | | | | | | | | |
| ia | ng | | | | | | | | | | |
| iao | Ø | | | | | | | | | | |
| ie | Ø | | | | | | | | | | |
| iou | Ø | | | | | | | | | | |
| io | ng | | | | | | | | | | |
| u | Ø | 1 | 4 | 5 | 0 | 0 | 1 | 0 | 0 | 8 | 0 |
| ua | Ø | | | | | | | | | | |
| ua | n | 2 | 0 | 2 | 3 | 0 | 4 | 1 | 0 | 3 | 0 |
| ua | ng | | | | | | | | | | |
| uo | Ø | 2 | 3 | 3 | 9 | 0 | 4 | 2 | 0 | 5 | 0 |
| uai | Ø | | | | | | | | | | |
| uei | Ø | 0 | 0 | 1 | 3 | 0 | 3 | 0 | 1 | 9 | 0 |
| ue | n | 4 | 0 | 1 | 0 | 0 | 2 | 1 | 1 | 1 | 0 |
| ue | ng | | | | | | | | | | |
| ü | Ø | | | | | | | | | | |
| ü | n | | | | | | | | | | |
| üe | Ø | | | | | | | | | | |
| üa | n | | | | | | | | | | |

Fig. 17d

| Vowel | Initial Final | z 1 | z 2 | z 3 | z 4 | z Ø | c 1 | c 2 | c 3 | c 4 | c Ø |
|---|---|---|---|---|---|---|---|---|---|---|---|
| a | Ø | 5 | 2 | 1 | 0 | 0 | 3 | 0 | 1 | 0 | 0 |
| a | n | 2 | 1 | 4 | 3 | 1 | 2 | 3 | 2 | 4 | 0 |
| a | ng | 3 | 0 | 1 | 3 | 0 | 5 | 1 | 0 | 0 | 0 |
| o | Ø | | | | | | | | | | |
| o | ng | 5 | 0 | 2 | 2 | 0 | 8 | 4 | 0 | 0 | 0 |
| e | Ø | 0 | 9 | 0 | 1 | 0 | 0 | 0 | 0 | 7 | 0 |
| e | n | 0 | 0 | 1 | 1 | 0 | 1 | 2 | 0 | 0 | 0 |
| e | ng | 5 | 0 | 0 | 4 | 0 | 0 | 2 | 0 | 1 | 0 |
| -i | Ø | 17 | 0 | 9 | 5 | 0 | 4 | 10 | 1 | 4 | 0 |
| er | Ø | | | | | | | | | | |
| ai | Ø | 4 | 0 | 4 | 3 | 0 | 1 | 4 | 4 | 3 | 0 |
| ei | Ø | 0 | 2 | 0 | 0 | 0 | | | | | |
| ao | Ø | 2 | 1 | 5 | 8 | 0 | 2 | 5 | 1 | 0 | 0 |
| ou | Ø | 2 | 0 | 1 | 2 | 0 | 0 | 0 | 0 | 2 | 0 |
| i | Ø | | | | | | | | | | |
| i | n | | | | | | | | | | |
| i | ng | | | | | | | | | | |
| ia | Ø | | | | | | | | | | |
| ia | n | | | | | | | | | | |
| ia | ng | | | | | | | | | | |
| iao | Ø | | | | | | | | | | |
| ie | Ø | | | | | | | | | | |
| iou | Ø | | | | | | | | | | |
| io | ng | | | | | | | | | | |
| u | Ø | 1 | 4 | 5 | 0 | 0 | 1 | 0 | 0 | 8 | 0 |
| ua | Ø | | | | | | | | | | |
| ua | n | 2 | 0 | 2 | 3 | 0 | 4 | 1 | 0 | 3 | 0 |
| ua | ng | | | | | | | | | | |
| uo | Ø | 2 | 3 | 3 | 9 | 0 | 4 | 2 | 0 | 5 | 0 |
| uai | Ø | | | | | | | | | | |
| uei | Ø | 0 | 0 | 1 | 3 | 0 | 3 | 0 | 1 | 9 | 0 |
| ue | n | 4 | 0 | 1 | 0 | 0 | 2 | 1 | 1 | 1 | 0 |
| ue | ng | | | | | | | | | | |
| ü | Ø | | | | | | | | | | |
| ü | n | | | | | | | | | | |
| üe | Ø | | | | | | | | | | |
| üa | n | | | | | | | | | | |

| Vowel | Final | s 1 | s 2 | s 3 | s 4 | s Ø | zh 1 | zh 2 | zh 3 | zh 4 | zh Ø | ch 1 | ch 2 | ch 3 | ch 4 | ch Ø |
|---|---|---|---|---|---|---|---|---|---|---|---|---|---|---|---|---|
| a | ø | 3 | 0 | 2 | 4 | 0 | 9 | 6 | 4 | 9 | 0 | 8 | 10 | 4 | 8 | 0 |
| a | n | 2 | 0 | 2 | 1 | 0 | 7 | 0 | 7 | 8 | 0 | 2 | 12 | 5 | 3 | 0 |
| a | ng | 2 | 0 | 3 | 1 | 0 | 8 | 0 | 4 | 10 | 0 | 6 | 9 | 5 | 4 | 0 |
| o | ø |  |  |  |  |  |  |  |  |  |  |  |  |  |  |  |
| o | ng | 4 | 0 | 3 | 5 | 0 | 7 | 0 | 4 | 5 | 0 | 6 | 3 | 1 | 2 | 0 |
| e | ø | 0 | 0 | 0 | 7 | 0 | 3 | 9 | 4 | 5 | 1 | 2 | 0 | 2 | 5 | 0 |
| e | n | 1 | 0 | 0 | 0 | 0 | 15 | 0 | 6 | 7 | 0 | 4 | 9 | 0 | 6 | 2 |
| e | ng | 1 | 0 | 0 | 0 | 0 | 14 | 0 | 2 | 9 | 0 | 6 | 14 | 2 | 1 | 0 |
| -i | ø | 14 | 0 | 1 | 14 | 1 | 18 | 12 | 14 | 35 | 0 | 10 | 7 | 6 | 9 | 0 |
| er | ø |  |  |  |  |  |  |  |  |  |  |  |  |  |  |  |
| ai | ø | 4 | 0 | 0 | 2 | 0 | 2 | 3 | 1 | 3 | 0 | 3 | 3 | 1 | 2 | 0 |
| ei | ø |  |  |  |  |  | 0 | 0 | 0 | 1 | 0 |  |  |  |  |  |
| ao | ø | 4 | 0 | 2 | 2 | 0 | 6 | 1 | 3 | 9 | 0 | 7 | 5 | 2 | 1 | 0 |
| ou | ø | 7 | 0 | 4 | 1 | 0 | 7 | 3 | 2 | 10 | 0 | 1 | 10 | 2 | 1 | 0 |
| i | ø |  |  |  |  |  |  |  |  |  |  |  |  |  |  |  |
| i | n |  |  |  |  |  |  |  |  |  |  |  |  |  |  |  |
| i | ng |  |  |  |  |  |  |  |  |  |  |  |  |  |  |  |
| ia | ø |  |  |  |  |  |  |  |  |  |  |  |  |  |  |  |
| ia | n |  |  |  |  |  |  |  |  |  |  |  |  |  |  |  |
| ia | ng |  |  |  |  |  |  |  |  |  |  |  |  |  |  |  |
| iao | ø |  |  |  |  |  |  |  |  |  |  |  |  |  |  |  |
| ie | ø |  |  |  |  |  |  |  |  |  |  |  |  |  |  |  |
| iou | ø |  |  |  |  |  |  |  |  |  |  |  |  |  |  |  |
| io | ng |  |  |  |  |  |  |  |  |  |  |  |  |  |  |  |
| u | ø | 4 | 1 | 0 | 14 | 0 | 11 | 9 | 7 | 18 | 0 | 3 | 10 | 8 | 10 | 0 |
| ua | ø |  |  |  |  |  | 1 | 0 | 1 | 0 | 0 | 1 | 0 | 0 | 0 | 0 |
| ua | n | 1 | 0 | 0 | 2 | 0 | 2 | 0 | 1 | 7 | 0 | 3 | 4 | 2 | 2 | 0 |
| ua | ng |  |  |  |  |  | 4 | 0 | 1 | 5 | 0 | 3 | 2 | 1 | 2 | 0 |
| uo | ø | 10 | 0 | 5 | 0 | 1 | 4 | 13 | 0 | 0 | 0 | 1 | 0 | 0 | 4 | 0 |
| uai | ø |  |  |  |  |  | 1 | 0 | 1 | 1 | 0 | 2 | 0 | 1 | 2 | 0 |
| uei | ø | 4 | 4 | 1 | 8 | 0 | 3 | 0 | 0 | 5 | 0 | 2 | 6 | 0 | 0 | 0 |
| ue | n | 2 | 0 | 4 | 0 | 0 | 3 | 0 | 1 | 0 | 0 | 3 | 6 | 1 | 0 | 0 |
| ue | ng |  |  |  |  |  |  |  |  |  |  |  |  |  |  |  |
| ü | ø |  |  |  |  |  |  |  |  |  |  |  |  |  |  |  |
| ü | n |  |  |  |  |  |  |  |  |  |  |  |  |  |  |  |
| üe | ø |  |  |  |  |  |  |  |  |  |  |  |  |  |  |  |
| üa | n |  |  |  |  |  |  |  |  |  |  |  |  |  |  |  |

Fig. 17e

| Vowel | Initial | sh | sh | sh | sh | sh | r | r | r | r | r | j | j | j | j | j |
|---|---|---|---|---|---|---|---|---|---|---|---|---|---|---|---|---|
| | Tone | 1 | 2 | 3 | 4 | Ø | 1 | 2 | 3 | 4 | Ø | 1 | 2 | 3 | 4 | Ø |
| | Final | | | | | | | | | | | | | | | |
| a | Ø | 10 | 0 | 1 | 5 | 0 | | | | | | | | | | |
| a | n | 15 | 0 | 3 | 15 | 0 | 0 | 3 | 3 | 0 | 0 | | | | | |
| a | ng | 6 | 0 | 4 | 4 | 1 | 1 | 2 | 3 | 1 | 0 | | | | | |
| o | Ø | | | | | | | | | | | | | | | |
| o | ng | | | | | | 0 | 12 | 1 | 0 | 0 | | | | | |
| e | Ø | 4 | 4 | 1 | 9 | 0 | 0 | 0 | 1 | 1 | 0 | | | | | |
| e | n | 11 | 4 | 5 | 8 | 0 | 0 | 4 | 3 | 10 | 0 | | | | | |
| e | ng | 6 | 1 | 1 | 5 | 0 | 1 | 1 | 0 | 0 | 0 | | | | | |
| -i | Ø | 13 | 10 | 7 | 29 | 1 | 0 | 0 | 0 | 1 | 0 | | | | | |
| er | Ø | | | | | | | | | | | | | | | |
| ai | Ø | 1 | 0 | 1 | 1 | 0 | | | | | | | | | | |
| ei | Ø | 0 | 1 | 0 | 0 | 0 | | | | | | | | | | |
| ao | Ø | 8 | 4 | 1 | 7 | 0 | 0 | 4 | 2 | 1 | 0 | | | | | |
| ou | Ø | 1 | 0 | 3 | 8 | 0 | 0 | 5 | 0 | 1 | 0 | | | | | |
| i | Ø | | | | | | | | | | | 34 | 24 | 10 | 31 | 0 |
| i | n | | | | | | | | | | | 9 | 0 | 9 | 13 | 0 |
| i | ng | | | | | | | | | | | 17 | 0 | 9 | 13 | 0 |
| ia | Ø | | | | | | | | | | | 17 | 5 | 8 | 6 | 0 |
| ia | n | | | | | | | | | | | 18 | 0 | 14 | 23 | 0 |
| ia | ng | | | | | | | | | | | 10 | 0 | 6 | 10 | 0 |
| iao | Ø | | | | | | | | | | | 17 | 2 | 14 | 10 | 0 |
| ie | Ø | | | | | | | | | | | 10 | 17 | 2 | 9 | 2 |
| iou | Ø | | | | | | | | | | | 8 | 0 | 6 | 10 | 0 |
| io | ng | | | | | | | | | | | 2 | 0 | 3 | 0 | 0 |
| u | Ø | 14 | 5 | 9 | 12 | 0 | | | | | | | | | | |
| ua | Ø | 1 | 0 | 1 | 1 | 0 | 0 | 10 | 3 | 5 | 0 | | | | | |
| ua | n | 3 | 0 | 0 | 1 | 0 | 0 | 0 | 0 | 3 | 0 | | | | | |
| ua | ng | 4 | 0 | 1 | 0 | 0 | | | | | | | | | | |
| uo | Ø | 1 | 0 | 0 | 6 | 0 | 0 | 0 | 0 | 4 | 0 | | | | | |
| uai | Ø | 2 | 0 | 1 | 3 | 0 | | | | | | | | | | |
| uei | Ø | 0 | 1 | 1 | 3 | 0 | 0 | 0 | 1 | 6 | 0 | | | | | |
| ue | n | 0 | 0 | 1 | 3 | 0 | 0 | 0 | 0 | 2 | 0 | | | | | |
| ue | ng | | | | | | | | | | | | | | | |
| ü | Ø | | | | | | | | | | | 12 | 5 | 9 | 19 | 0 |
| ü | n | | | | | | | | | | | 7 | 0 | 0 | 7 | 0 |
| üe | Ø | | | | | | | | | | | 1 | 24 | 1 | 1 | 0 |
| üa | n | | | | | | | | | | | 6 | 0 | 1 | 6 | 0 |

Fig. 17f

| Vowel | Final | q 1 | q 2 | q 3 | q 4 | q Ø | x 1 | x 2 | x 3 | x 4 | x Ø | g 1 | g 2 | g 3 | g 4 | g Ø |
|---|---|---|---|---|---|---|---|---|---|---|---|---|---|---|---|---|
| a | Ø | | | | | | | | | | | 5 | 2 | 0 | 1 | 0 |
| a | n | | | | | | | | | | | 13 | 0 | 7 | 3 | 0 |
| a | ng | | | | | | | | | | | 7 | 0 | 2 | 2 | 0 |
| o | Ø | | | | | | | | | | | | | | | |
| o | ng | | | | | | | | | | | 14 | 0 | 4 | 3 | 0 |
| e | Ø | | | | | | | | | | | 12 | 12 | 4 | 5 | 0 |
| e | n | | | | | | | | | | | 2 | 1 | 1 | 2 | 0 |
| e | ng | | | | | | | | | | | 4 | 0 | 6 | 1 | 0 |
| -i | Ø | | | | | | | | | | | | | | | |
| er | Ø | | | | | | | | | | | | | | | |
| ai | Ø | | | | | | | | | | | 2 | 0 | 1 | 6 | 0 |
| ei | Ø | | | | | | | | | | | 0 | 0 | 1 | 0 | 0 |
| ao | Ø | | | | | | | | | | | 6 | 0 | 6 | 5 | 0 |
| ou | Ø | | | | | | | | | | | 6 | 0 | 3 | 9 | 0 |
| i | Ø | 15 | 26 | 9 | 14 | 0 | 48 | 5 | 9 | 5 | 0 | | | | | |
| i | n | 4 | 10 | 2 | 1 | 0 | 8 | 1 | 0 | 3 | 0 | | | | | |
| i | ng | 8 | 4 | 3 | 4 | 0 | 5 | 5 | 3 | 6 | 0 | | | | | |
| ia | Ø | 3 | 0 | 1 | 3 | 0 | 3 | 11 | 0 | 6 | 0 | | | | | |
| ia | n | 12 | 10 | 4 | 8 | 0 | 11 | 11 | 7 | 13 | 0 | | | | | |
| ia | ng | 10 | 4 | 4 | 4 | 0 | 9 | 4 | 6 | 7 | 0 | | | | | |
| iao | Ø | 9 | 9 | 4 | 8 | 0 | 20 | 1 | 3 | 6 | 0 | | | | | |
| ie | Ø | 1 | 1 | 1 | 9 | 0 | 5 | 10 | 2 | 14 | 0 | | | | | |
| iou | Ø | 7 | 9 | 0 | 0 | 0 | 8 | 0 | 2 | 9 | 0 | | | | | |
| io | ng | 0 | 4 | 0 | 0 | 0 | 6 | 2 | 0 | 0 | 0 | | | | | |
| u | Ø | | | | | | | | | | | 16 | 1 | 16 | 7 | 0 |
| ua | Ø | | | | | | | | | | | 6 | 0 | 2 | 3 | 0 |
| ua | n | | | | | | | | | | | 7 | 0 | 2 | 9 | 0 |
| ua | ng | | | | | | | | | | | 3 | 0 | 2 | 2 | 0 |
| uo | Ø | | | | | | | | | | | 6 | 4 | 3 | 1 | 1 |
| uai | Ø | | | | | | | | | | | 2 | 0 | 1 | 1 | 0 |
| uei | Ø | | | | | | | | | | | 10 | 0 | 9 | 9 | 0 |
| ue | n | | | | | | | | | | | 0 | 0 | 5 | 1 | 0 |
| ue | ng | | | | | | | | | | | | | | | |
| ü | Ø | 13 | 10 | 5 | 5 | 0 | 10 | 1 | 4 | 12 | 1 | | | | | |
| ü | n | 1 | 3 | 0 | 0 | 0 | 6 | 11 | 0 | 9 | 0 | | | | | |
| üe | Ø | 3 | 1 | 0 | 7 | 0 | 3 | 3 | 2 | 2 | 0 | | | | | |
| üa | n | 2 | 11 | 2 | 2 | 0 | 6 | 3 | 3 | 9 | 0 | | | | | |

Fig. 17g

| Vowel | Initial | k | k | k | k | k | h | h | h | h | h |
|---|---|---|---|---|---|---|---|---|---|---|---|
| | Tone | 1 | 2 | 3 | 4 | Ø | 1 | 2 | 3 | 4 | Ø |
| | Final | | | | | | | | | | |
| a | Ø | 3 | 0 | 4 | 0 | 0 | 2 | 1 | 1 | 1 | 0 |
| a | n | 6 | 0 | 5 | 2 | 0 | 6 | 8 | 3 | 11 | 0 |
| a | ng | 5 | 1 | 0 | 5 | 0 | 1 | 5 | 0 | 2 | 0 |
| o | Ø | | | | | | | | | | |
| o | ng | 2 | 0 | 3 | 2 | 0 | 5 | 8 | 1 | 2 | 0 |
| e | Ø | 18 | 3 | 3 | 12 | 0 | 4 | 18 | 0 | 9 | 0 |
| e | n | 0 | 0 | 4 | 0 | 0 | 0 | 1 | 2 | 1 | 0 |
| e | ng | 3 | 0 | 0 | 0 | 0 | 3 | 7 | 0 | 1 | 0 |
| -i | Ø | | | | | | | | | | |
| er | Ø | | | | | | | | | | |
| ai | Ø | 3 | 0 | 5 | 1 | 0 | 2 | 3 | 2 | 5 | 0 |
| ei | Ø | 1 | 0 | 0 | 0 | 0 | 2 | 0 | 0 | 0 | 0 |
| ao | Ø | 1 | 0 | 4 | 3 | 0 | 3 | 8 | 2 | 5 | 0 |
| ou | Ø | 3 | 0 | 1 | 5 | 0 | 1 | 6 | 1 | 5 | 0 |
| i | Ø | | | | | | | | | | |
| i | n | | | | | | | | | | |
| i | ng | | | | | | | | | | |
| ia | Ø | | | | | | | | | | |
| ia | n | | | | | | | | | | |
| ia | ng | | | | | | | | | | |
| iao | Ø | | | | | | | | | | |
| ie | Ø | | | | | | | | | | |
| iou | Ø | | | | | | | | | | |
| io | ng | | | | | | | | | | |
| u | Ø | 5 | 0 | 1 | 3 | 0 | 7 | 19 | 4 | 11 | 0 |
| ua | Ø | 1 | 0 | 2 | 3 | 0 | 3 | 6 | 0 | 6 | 0 |
| ua | n | 2 | 0 | 1 | 0 | 0 | 2 | 8 | 1 | 11 | 0 |
| ua | ng | 5 | 3 | 0 | 6 | 0 | 3 | 15 | 4 | 1 | 1 |
| uo | Ø | 0 | 0 | 0 | 5 | 0 | 5 | 2 | 4 | 10 | 0 |
| uai | Ø | 0 | 0 | 2 | 7 | 0 | 0 | 5 | 0 | 1 | 0 |
| uei | Ø | 4 | 11 | 1 | 8 | 0 | 10 | 4 | 2 | 18 | 0 |
| ue | n | 4 | 0 | 1 | 1 | 0 | 4 | 5 | 0 | 2 | 0 |
| ue | ng | | | | | | | | | | |
| ü | Ø | | | | | | | | | | |
| ü | n | | | | | | | | | | |
| üe | Ø | | | | | | | | | | |
| üa | n | | | | | | | | | | |

| shi4 | | | | | | | | | |
|---|---|---|---|---|---|---|---|---|---|
| 1 是 | 2 士 | 3 食 | 4 事 | 5 螫 | 6 噬 | 7 誓 | 8 嗜 | 9 释 | 0 弑 |

| shi4 | | | | | | | | | |
|---|---|---|---|---|---|---|---|---|---|
| 1 铈 | 2 莳 | 3 逝 | 4 适 | 5 柿 | 6 拭 | 7 恃 | 8 室 | 9 饰 | 0 视 |

| shi4 | | | | | | | | | |
|---|---|---|---|---|---|---|---|---|---|
| 1 侍 | 2 势 | 3 试 | 4 似 | 5 式 | 6 仕 | 7 世 | 8 示 | 9 市 | 0 氏 |

| shi4 | | | | | | | | | |
|---|---|---|---|---|---|---|---|---|---|
| 1 使 | 2 识 | 3 峙 | 4 轼 | 5 豉 | 6 筮 | 7 舐 | 8 礻 | 9 贳 | 0 饣 |

| shi4 | |
|---|---|
| 1 唑 | 2 谥 |

Fig. 20

| Vowel Clusters | Initials | | | | | | | |
|---|---|---|---|---|---|---|---|---|
| | ø | b | p | m | f | d | t | n | l |
| a | a | ba | pa | ma | fa | da | ta | na | la |
| o | o | bo | po | mo | fo | | | | |
| e | e | | | me | | de | te | ne | le |
| -I/er | er | | | | | | | | |
| ai | ai | bai | pai | mai | | dai | tai | nai | lai |
| ei | ei | bei | pei | mei | fei | dei | tai | nai | lai |
| ao | ao | bao | pao | mao | | dao | tao | nao | lao |
| ou | ou | | pou | mou | fou | dou | tou | nou | lou |
| an | an | ban | pan | man | fan | dan | tan | nan | lan |
| en | en | ben | pen | men | fen | den | | nen | |
| ang | ang | bang | pang | mang | fang | dang | tang | nang | lang |
| eng | ang | beng | peng | meng | feng | deng | teng | neng | leng |
| ong | | | | | | dong | tong | nong | long |
| i | yi | bi | pi | mi | | ti | li | ni | li |
| ia | ya | | | | | | | | lia |
| ie | ye | bie | pie | mie | | die | tie | nie | lie |
| iou | you | | | miu | | diu | | niu | liu |
| ian | yan | bian | pian | mian | | dian | tian | nian | lian |
| in | yin | bin | pin | min | | | | nin | lin |
| iang | yang | | | | | | | niang | liang |
| ing | ying | bing | ping | ming | | ding | ting | ning | ling |
| iong | yong | | | | | | | | |
| u | wu | bu | pu | mu | fu | du | tu | nu | lu |
| ua | wa | | | | | | | | |
| uo | wo | | | | | duo | tuo | nuo | luo |
| uai | wai | | | | | | | | |
| uei | wei | | | | | dui | tui | | |
| uan | wan | | | | | duan | tuan | nuan | luan |
| uen | wen | | | | | dun | tuen | | lun |
| uang | wang | | | | | | | | |
| ueng | weng | | | | | | | | |
| ü | yu | | | | | | | nü | lü |
| üe | yue | | | | | | | nüe | lüe |
| üan | yuan | | | | | | | | |
| ün | yun | | | | | | | | |

Fig. 21a

| Vowel Clusters | Initials | | | | | |
|---|---|---|---|---|---|---|
| | z/j | c/q | s/x | zh | ch | sh |
| a | za | ca | sa | zha | cha | sha |
| o | | | | | | |
| e | ze | ce | se | zhe | che | she |
| -I/er | zi | ci | si | zhi | chi | shi |
| ai | zai | cai | sai | zhai | chai | shai |
| ei | zei | | | | | shei |
| ao | zao | cao | sao | zhao | chao | shao |
| ou | zou | cou | sou | zhou | chou | shou |
| an | zan | can | san | zhan | chan | shan |
| en | zen | cen | sen | zhen | chen | shen |
| ang | zang | cang | sang | zhang | chang | shang |
| eng | zeng | ceng | seng | zheng | cheng | sheng |
| ong | zong | cong | song | zhong | chong | |
| i | ji | qi | xi | | | |
| ia | jia | qia | xia | | | |
| ie | jie | qie | xie | | | |
| iou | jiu | qiu | xiu | | | |
| ian | jian | qian | xian | | | |
| in | jin | qin | xin | | | |
| iang | jiang | qiang | xiang | | | |
| ing | jing | qing | xing | | | |
| iong | jiong | qiong | xiong | | | |
| u | zu | cu | su | zhu | chu | shu |
| ua | | | | zhua | chua | shua |
| uo | zuo | cuo | suo | zhuo | chuo | shuo |
| uai | | | | zhuai | chuai | shuai |
| uei | zui | cui | sui | zhui | chui | shui |
| uan | zuan | cuan | suan | zhuan | chuan | shuan |
| uen | zun | cun | sun | zhun | chun | shun |
| uang | | | | zhuang | chuang | shuang |
| ueng | | | | | | |
| ü | ju | qu | xu | | | |
| üe | jue | que | xue | | | |
| üan | juan | quan | xuan | | | |
| ün | jun | qun | xun | | | |

Fig. 21b

| Vowel Clusters | Initials | | | |
|---|---|---|---|---|
| | r | g | k | h |
| a | | ga | ka | ha |
| o | | | | |
| e | re | ge | ke | he |
| -I/er | ri | | | |
| ai | | gai | kai | hai |
| ei | | gei | kei | hei |
| ao | rao | gao | kao | hao |
| ou | rou | gou | kou | hou |
| an | ran | gan | kan | han |
| en | ren | gen | ken | hen |
| ang | rang | gang | kang | hang |
| eng | reng | geng | kang | hang |
| ong | rong | gong | kong | hong |
| i | | | | |
| ia | | | | |
| ie | | | | |
| iou | | | | |
| ian | | | | |
| in | | | | |
| iang | | | | |
| ing | | | | |
| iong | | | | |
| u | ru | gu | ku | hu |
| ua | rua | | | |
| uo | ruo | guo | kuo | huo |
| uai | | guai | kuai | huai |
| uei | rui | gui | kui | hui |
| uan | ruan | guan | kuan | huan |
| uen | run | gun | kun | hun |
| uang | | guang | kuang | huang |
| ueng | | | | |
| ü | | | | |
| üe | | | | |
| üan | | | | |
| ün | | | | |

Fig. 21c

First Chord

| pinyin initial | ø/w/y | b | p |
|---|---|---|---|
| m | f | d | t |
| n | l | z/j | c/q |
| s/x | zh | ch | sh |
| r | g | k | h |
| | | | |
| | | | |
| SPACE | 0 - 9 | PUNCT | CANCEL |

Second Chord

| Vowel | a | o | e |
|---|---|---|---|
| i/er | ai | ei | ao |
| ou | i | ia | iao |
| ie | iu | u | ua |
| uo | uai | ue | ü |
| üe | | | |
| | | | |
| SPACE | 0 - 9 | PUNCT | CANCEL |

| pinyin endings | a an ang | o ong | e en eng |
|---|---|---|---|
| i er | ai | ei | ao |
| ou | i in ing | ia ian iang | iao |
| ie | iou iong | u | ua uan uang |
| uo | uai | ui un weng | ü ün |
| üe üan | | | |
| | | | |
| SPACE | 0 - 9 | PUNCT | CANCEL |

Third Chord

| Tone & Final | Ø(1) | -n(1) | -ng(1) |
|---|---|---|---|
| | Ø(2) | -n(2) | -ng(2) |
| | Ø(3) | -n(3) | -ng(3) |
| | Ø(4) | -n(4) | -ng(4) |
| | Ø(all) | -n(all) | -ng(all) |
| | Ø(Ø) | -n(Ø) | -ng(Ø) |
| | | | |
| SPACE | 0 - 9 | PUNCT | CANCEL |

Fig. 22a

| 注音元音 | ㄚㄢㄤ | ㄛㄨㄥ | ㄜㄣ |
|---|---|---|---|
| ㄦ | ㄞ | ㄟ | ㄠ |
| ㄡ | 一ㄢ 一ㄤ | 一ㄚ | 一ㄠ |
| 一ㄝ | ㄩㄢ ㄩㄥ | ㄨ | ㄨㄚ ㄨㄢ ㄨㄤ |
| ㄨㄛ | ㄨㄞ | ㄨㄟ ㄨㄣ | ㄩㄣ |
| ㄩㄝ | | | |
| | | | |
| SPACE | 0-9 | PUNCT | CANCEL |

| 注音辅音 | 元音 | ㄅ | ㄆ |
|---|---|---|---|
| ㄇ | ㄈ | ㄉ | ㄊ |
| ㄋ | ㄌ | ㄗ | ㄘ |
| ㄙ | ㄓ/ㄐ | ㄔ/ㄑ | ㄕ |
| ㄖ | ㄍ | ㄎ | ㄏ |
| | | | |
| | | | |
| SPACE | 0-9 | PUNCT | CANCEL |

Fig. 22b

| Chord | Initial | Vowel Cluster | Tone & Final |
|---|---|---|---|
| ○○○○● | ø-/w-/y- | -a- | 1st Tone+ "-Ø" |
| ○○○●○ | b- | -o- | 1st Tone+ "-n" |
| ○○○●● | p- | -e- | 1st Tone+ "-ng" |
| ○○●○○ | m- | -i-/-er | |
| ○○●○● | f- | -ai | 2nd Tone+ "-Ø" |
| ○○●●○ | t- | -ao | 2nd Tone+ "-ng" |
| ○○●●● | d- | -ei | 2nd Tone+ "-n" |
| ○●○○○ | n- | -ou | |
| ○●○○● | l- | -i- | 3rd Tone+ "-Ø" |
| ○●○●○ | z-/j- | -ia- | 3rd Tone+ "-n" |
| ○●○●● | c-/q- | -iao | 3rd Tone+ "-ng" |
| ○●●○○ | s-/x- | -ie- | |
| ○●●○● | zh- | -iu- | 4th Tone+ "-Ø" |
| ○●●●○ | ch- | -u | 4th Tone+ "-n" |
| ○●●●● | sh- | -ua- | 4th Tone+ "-ng" |
| ●○○○○ | r- | -uo | |
| ●○○○● | g- | -uai | All Tones+ "-Ø" |
| ●○○●○ | k- | -ue- | All Tones+ "-n" |
| ●○○●● | h- | -ü- | All Tones+ "-ng" |
| ●○●○○ | | -üe- | |
| ●○●○● | | | Ø Tone+ "-Ø" |
| ●○●●○ | | | Ø Tone+ "-n" |
| ●○●●● | | | Ø Tone+ "-ng" |
| ●●○○○ | | | |
| ●●○○● | | | |
| ●●○●○ | | | |
| ●●○●● | | | |
| ●●●○○ | SPACE | SPACE | SPACE |
| ●●●○● | 0-9 | 0-9 | 0-9 |
| ●●●●○ | Punct | Punct | Punct |
| ●●●●● | Cancel | Cancel | Cancel |

| Initial | ø/w/y | b | p |
|---|---|---|---|
| m | f | d | t |
| n | l | z/j | c/q |
| s/x | zh | ch | sh |
| r | g | k | h |
| | | | |
| SPACE | 0-9 | PUNCT | 删除 |

2

| sh | sha,shan, shang | | she,shen, sheng |
|---|---|---|---|
| shi | shai | 谁 | shao |
| shou | | | |
| | | | |
| shuo | shuai | shui,shun | shua,shuan, shuang |
| | | | |
| | | | |
| SPACE | 0-9 | PUNCT | 删除 |

3

| shi | s h ī | | |
|---|---|---|---|
| | s h í | | |
| | s h ǐ | | |
| | s h ǐ | | |
| | s h ì | | |
| | | | |
| | | | |
| SPACE | 0-9 | PUNCT | 删除 |

4

| s h ǐ | 士 | 亻 | 氏 |
|---|---|---|---|
| 市 | 示 | 世 | 礻 |
| 仕 | 式 | 似 | 识 |
| 使 | 试 | 势 | 事 |
| 侍 | 视 | 饰 | 室 |
| 恃 | 拭 | 柿 | 是 |
| 适 | 食 | 峙 | 逝 |
| 莳 | 唑 | ... | 删除 |

| Initial | ø/w/y | b | p |
|---|---|---|---|
| m | f | d | t |
| n | l | z/j | c/q |
| s/x | zh | ch | sh |
| r | g | k | h |
| | | | |
| | | | |
| SPACE | 0-9 | PUNCT | 删除 |

2

| sh | sha,shan,shang | | she,shen,sheng |
|---|---|---|---|
| shi | shai | 谁 | shao |
| shou | | | |
| shuo | shuai | shui,shun | shua,shuan,shuang |
| | | | |
| | | | |
| SPACE | 0-9 | PUNCT | 删除 |

3

| shi | s h ī | | |
|---|---|---|---|
| | s h í | | |
| | s h ǐ | | |
| | s h ì | | |
| | s h i | | |
| | | | |
| | | | |
| SPACE | 0-9 | PUNCT | 删除 |

4

| s h ì | 士 | 亡 | 氏 |
|---|---|---|---|
| 市 | 示 | 世 | 礻 |
| 仕 | 式 | 似 | 识 |
| 使 | 试 | 势 | 事 |
| 侍 | 视 | 饰 | 室 |
| 恃 | 拭 | 柿 | 是 |
| 适 | 食 | 峙 | 逝 |
| 莳 | 唑 | ... | 删除 |

5

| s h ì (2) | 轼 | 贳 | 舐 |
|---|---|---|---|
| 豉 | 铈 | 弑 | 释 |
| 筮 | 嗜 | 谥 | 螫 |
| 噬 | 螫 | | |
| | | | |
| | | | |
| | | | |
| | | | 删除 |

Fig. 25

First Chord

| Initial | ø/w/y | b | p |
|---|---|---|---|
| m | f | d | t |
| n | l | z/j | c/q |
| s/x | zh | ch | sh |
| r | g | k | h |
|  |  |  |  |
|  |  |  |  |
| SPACE | 0-9 | PUNCT | 删除 |

Second Chord

| g- | ga,gan,gang | gong | ge,gen,geng |
|---|---|---|---|
|  | gai | 给 | gao |
| gou |  |  |  |
|  |  |  | gua,guan,guang |
| guo | 乖掴拐怪 | gui,gun |  |
|  |  |  |  |
|  |  |  |  |
| SPACE | 0-9 | PUNCT | 删除 |

Fig. 26

| | | | | | | | |
|---|---|---|---|---|---|---|---|
| 佛 | f ŏ | "Buddha" | ( 8 strokes) | 谁 | s h ĕ i | "who" | (10 strokes) |
| 得 | d ĕ i | "should" | (11 strokes) | 日 | r ì | "day" | ( 4 strokes) |
| 暖 | n u ă n | "warm" | (13 strokes) | 耨 | n ò u | "weed" | (17 strokes) |
| 这 | z h è i | "this" | ( 7 strokes) | | | | |

Fig. 27

| Initial | ø/w/y | b | p |
|---|---|---|---|
| m | f | d | t |
| n | l | z/j | c/q |
| s/x | zh | ch | sh |
| r | g | k | h |
| | | | |
| | | | |
| SPACE | 0 - 9 | PUNCT | 删除 |

| b- | ba,ban,bang | bo | ben,beng |
|---|---|---|---|
| | bai | bei | bao |
| | bi,bin.bing | bian | biao |
| bie | | bu | |
| | | | |
| | | | |
| | | | |
| SPACE | 0 - 9 | PUNCT | 删除 |

| bai | 掰 | | |
|---|---|---|---|
| | 白 | | |
| | b ǎ i | | |
| | 败拜稗呗 | | |
| | | | |
| | | | |
| | | | |
| SPACE | 0 - 9 | PUNCT | 删除 |

Fig. 28

| | | | | | | | | |
|---|---|---|---|---|---|---|---|---|
| 我 | wǒ | | "I" | ( 7 strokes) | 抹 | mǒ | "apply" | ( 8 strokes) |
| 外 | wà | i | "outside" | ( 5 strokes) | 放 | fà n g | "put" | ( 8 strokes) |
| 北 | bě | i | "North" | ( 5 strokes) | 打 | dǎ | "make" | ( 5 strokes) |
| 剖 | pō | u | "analyze" | (10 strokes) | 能 | né n g | "be able" | (11 strokes) |

Fig. 29

| Initial | ø/w/y | b | p |
|---|---|---|---|
| m | f | d | t |
| n | l | z/j | c/q |
| s/x | zh | ch | sh |
| r | g | k | h |
|  |  |  |  |
|  |  |  |  |
| SPACE | 0-9 | PUNCT | 删除 |

1

| sh | sha,shan,shang |  | she,shen,sheng |
|---|---|---|---|
| shi | shai | 谁 | shao |
| shou |  |  |  |
|  |  |  |  |
| shuo | shuai | shui,shun | shua,shuan,shuang |
|  |  |  |  |
|  |  |  |  |
| SPACE | 0-9 | PUNCT | 删除 |

2

| shi | s h ī |  |  |
|---|---|---|---|
|  | s h í |  |  |
|  | s h ǐ |  |  |
|  | s h ì |  |  |
|  | s h i |  |  |
|  |  |  |  |
|  |  |  |  |
| SPACE | 0-9 | PUNCT | 删除 |

| s h i | 十 | 士 | 乇 |
|---|---|---|---|
| 尸 | 氏 | 什 | 尸 |
| 衤 | 市 | 示 | 仕 |
| 石 | 失 | 世 | 式 |
| 似 | 师 | 时 | 识 |
| 豕 | 事 | 侍 | 饰 |
| 视 | 势 | 试 | 使 |
| 实 | 始 | ... | 删除 |

5

| s h i | 诗 | 是 | 恃 |
|---|---|---|---|
| 拭 | 柿 | 逝 | 食 |
| 适 | 峙 | 拾 | 施 |
| 狮 | 虱 | 炻 | 莳 |
| 室 | 轼 | 舐 | 贳 |
| 唑 | 蚀 | 射 | 驶 |
| 屎 | 埘 | 铈 | 豉 |
| 提 | 硕 | ... | 删除 |

6

| s h i | 匙 | 螄 | 释 |
|---|---|---|---|
| 谥 | 湿 | 殖 | 弑 |
| 嗜 | 笶 | 著 | 誓 |
| 噓 | 鲥 | 酾 | 噬 |
| 鳌 | 飔 | | |
| | | | |
| | | | |
| | | | 删除 |

| LOWER | NULL | NULL | NULL |
|---|---|---|---|
| space | \032 | | LOWER |
| a | a | | LOWER |
| b | b | | LOWER |
| c | c | | LOWER |
| d | d | | LOWER |
| e | e | | LOWER |
| f | f | | LOWER |
| g | g | | LOWER |
| h | h | | LOWER |
| i | i | | LOWER |
| j | j | | LOWER |
| k | k | | LOWER |
| l | l | | LOWER |
| m | m | | LOWER |
| n | n | | LOWER |
| o | o | | LOWER |
| p | p | | LOWER |
| q | q | | LOWER |
| r | r | | LOWER |
| s | s | | LOWER |
| t | t | | LOWER |
| u | u | | LOWER |
| v | v | | LOWER |
| w | w | | LOWER |
| x | x | | LOWER |
| y | y | | LOWER |
| z | z | | LOWER |
| UPPER | NULL | | UPPER |
| NUMBER | NULL | | NUMBER |
| PUNCT | NULL | | PUNCT |
| backspace | \008 | | LOWER |

| UPPER | NULL | NULL | NULL |
|---|---|---|---|
| space | \032 | A | LOWER |
| A | A | B | LOWER |
| B | B | C | LOWER |
| C | C | D | LOWER |
| D | D | E | LOWER |
| E | E | F | LOWER |
| F | F | G | LOWER |
| G | G | H | LOWER |
| H | H | I | LOWER |
| I | I | J | LOWER |
| J | J | K | LOWER |
| K | K | L | LOWER |
| L | L | M | LOWER |
| M | M | N | LOWER |
| N | N | O | LOWER |
| O | O | P | LOWER |
| P | P | Q | LOWER |
| Q | Q | R | LOWER |
| R | R | S | LOWER |
| S | S | T | LOWER |
| T | T | U | LOWER |
| U | U | V | LOWER |
| V | V | W | LOWER |
| W | W | X | LOWER |
| X | X | Y | LOWER |
| Y | Y | Z | LOWER |
| Z | Z | | LOWER |
| CAPLOCK | NULL | | CAPLOCK |
| NUMBER | NULL | | NUMBER |
| PUNCT | NULL | | PUNCT |
| LOWER | | | LOWER |

| NUMBER | NULL | NULL | NULL |
|---|---|---|---|
| . | . | | LOWER |
| 0 | 0 | | LOWER |
| 1 | 1 | | LOWER |
| 2 | 2 | | LOWER |
| 3 | 3 | | LOWER |
| 4 | 4 | | LOWER |
| 5 | 5 | | LOWER |
| 6 | 6 | | LOWER |
| 7 | 7 | | LOWER |
| 8 | 8 | | LOWER |
| 9 | 9 | | LOWER |
| ( | ( | | LOWER |
| ) | ) | | LOWER |
| − | − | | LOWER |
| + | + | | LOWER |
| ' | ' | | LOWER |
| * | * | | LOWER |
| / | / | | LOWER |
| % | % | | LOWER |
| = | = | | LOWER |
| < | < | | LOWER |
| > | > | | LOWER |
| [ | [ | | LOWER |
| ] | ] | | LOWER |
| { | { | | LOWER |
| } | } | | LOWER |
| UPPER | NULL | | UPPER |
| NUMLOCK | NULL | | NUMLOCK |
| PUNCT | NULL | | PUNCT |
| LOWER | | | LOWER |

| PUNCT | NULL | NULL |
|---|---|---|
| . | . | LOWER |
| , | , | LOWER |
| ? | ? | LOWER |
| : | : | LOWER |
| " | " | LOWER |
| ; | ; | LOWER |
| − | − | LOWER |
| @ | @ | LOWER |
| # | # | LOWER |
| & | & | LOWER |
| / | / | LOWER |
| ( | ( | LOWER |
| ) | ) | LOWER |
| < | < | LOWER |
| > | > | LOWER |
| ¿ | ¿ | LOWER |
| ' | ' | LOWER |
| * | * | LOWER |
| \ | \ | LOWER |
| $ | $ | LOWER |
| = | = | LOWER |
| ! | ! | LOWER |
| , | , | LOWER |
| [ | [ | LOWER |
| ] | ] | LOWER |
| { | { | LOWER |
| } | } | LOWER |
| UPPER | NULL | UPPER |
| NUMBER | NULL | NUMBER |
| NULL | NULL | LOWER |
| LOWER | | LOWER |

Fi. 32a

| CAPLOCK | NULL | NULL | NUMLOCK | NULL | NULL |
|---|---|---|---|---|---|
| space | \032 | CAPLOCK | . | . | NUMLOCK |
| A | A | CAPLOCK | - | - | NUMLOCK |
| B | B | CAPLOCK | 0 | 0 | NUMLOCK |
| C | C | CAPLOCK | 1 | 1 | NUMLOCK |
| D | D | CAPLOCK | 2 | 2 | NUMLOCK |
| E | E | CAPLOCK | 3 | 3 | NUMLOCK |
| F | F | CAPLOCK | 4 | 4 | NUMLOCK |
| G | G | CAPLOCK | 5 | 5 | NUMLOCK |
| H | H | CAPLOCK | 6 | 6 | NUMLOCK |
| I | I | CAPLOCK | 7 | 7 | NUMLOCK |
| J | J | CAPLOCK | 8 | 8 | NUMLOCK |
| K | K | CAPLOCK | 9 | 9 | NUMLOCK |
| L | L | CAPLOCK | ( | ( | NUMLOCK |
| M | M | CAPLOCK | ) | ) | NUMLOCK |
| N | N | CAPLOCK | — | — | NUMLOCK |
| O | O | CAPLOCK | + | + | NUMLOCK |
| P | P | CAPLOCK | - | - | NUMLOCK |
| Q | Q | CAPLOCK | * | * | NUMLOCK |
| R | R | CAPLOCK | / | / | NUMLOCK |
| S | S | CAPLOCK | % | % | NUMLOCK |
| T | T | CAPLOCK | = | = | NUMLOCK |
| U | U | CAPLOCK | < | < | NUMLOCK |
| V | V | CAPLOCK | > | > | NUMLOCK |
| W | W | CAPLOCK | [ | [ | NUMLOCK |
| X | X | CAPLOCK | ] | ] | NUMLOCK |
| Y | Y | CAPLOCK | { | { | NUMLOCK |
| Z | Z | CAPLOCK | } | } | NUMLOCK |
| LOWER | NULL | LOWER | UPPER | NULL | UPPER |
| NUMBER | NULL | NUMBER | LOWER | NULL | LOWER |
| PUNCT | NULL | PUNCT | PUNCT | NULL | PUNCT |
| backspace | \008 | CAPLOCK | backspace | \008 | NUMLOCK |

Fig. 32b

OHAI TECHNOLOGY USER INTERFACE

This application claims the benefit of U.S. Provisional Application No. 60/039,390, filed Feb. 27, 1997.

BACKGROUND OF THE INVENTION

The workstation user environment is characterized by sufficient surface room to put a computer, a mouse and other paraphernalia necessary to do a job of work involving a PC as a tool. In the workstation user environment, most user applications that require input assume a mouse and keyboard. Consequently, the process of input involves two hands manipulating these two input devices. To send input to applications, the user types with both hands, removes one hand from the keyboard, manipulates the mouse, and then returns the hand to the keyboard. While they are on the keyboard, the hands and fingers constantly move from key to key while the (typical) user attempts to watch the user application screens or windows and the keyboard simultaneously. One Handed Input, OHAI, technology is an alternative which allows a user to keep his attention on the screen by removing the possibility of erroneous input through misstruck keys.

SUMMARY OF THE INVENTION

The present invention relates to chord-based or syllable-based input systems and methods for presenting and delivering user application input choices and subsystems for generating application inputs in response to user generated combinations of finger-presses, hereinafter chords, or spoken syllables. OHAI denotes One Handed Input.

The present invention includes: systems, methods, and apparatus for presenting user application input choices, chord-based or syllable-based input apparatus, and subsystems for generating application inputs in response to user chords or spoken syllables.

The new system for presenting and delivering user application input choices includes memory associating chord-sequences or syllable-sequences with complex user application input choices, an optional display associating chords or syllables with complex user application input choices, an input device for inputting chords or syllables, a first processor for generating input signals from chords or syllables, a second processor, connected to the first processor, for receiving sequences of input signals from the first processor, for evaluating the input signal sequences, connected to the optional display for modifying the display according to the evaluated input signal sequences, and connected the user application for sending user application input choices to the user application.

There are numerous potential embodiments of the input device. In one preferred embodiment, the input device resembles a joystick and includes a base and a key carrier extending from the base. The key carrier includes a bottom that is connected to the base, a top surface, a pair of side surfaces, a front surface and a back surface. Keys are provided along one or more of the surfaces. In preferred embodiments, a set of four keys extend widthwise along either a side surface or the front surface. A single key is provided along the top surface. The keys are positioned such that when a user grasps the device, the user's thumb rests on the button along the top and the user's fingers rest on the set of four keys. Each key may be depressed using a single finger or thumb without removing or repositioning the digits.

In another preferred embodiment, the input device is integral with the a laptop computer running the user application. At least one set of depressible buttons is provided on the computer housing. In a related preferred embodiment, two sets of five ergonomically placed buttons are provided, with one set positioned on the keyboard section of the housing and another set provided on the monitor section of the housing.

When the user application resides on a wearable computer, one embodiment of the input device is a glove including sensors integrated into the finger tips of the glove. An alternative embodiment of the input device is a voice-input processor of sufficient sensitivity to distinguish among a small set of spoken syllables. The preferred embodiment of the display on wearable computers is a grid showing associations of chords or syllables which is displayed on a headset having a small monitor.

The first processor monitors user-generated chords or syllables and sends a corresponding input signal to the second processor. The first processor may include a chip housing a program and may be mounted in the input device.

The present method for presenting and delivering user application input choices includes the steps of relating complex user application input choices to sequences of chords or syllables in memory, optionally displaying associations of chords or syllables within sequences of chords or syllables associated with complex user application input choices, receiving user generated chords or syllables using an input device, generating input signals from the input chords or syllables, evaluating input signal sequences, modifying the optional display to prompt for chords or syllables within chord or syllable sequences associated with complex user application input choices, and sending complex user application input choices to user applications.

In preferred embodiments, the display is a grid arrangement of blocks including a grid name block and multiple chord blocks. Each chord block includes a row of finger cells and a large selection cell positioned near the row of finger cells. The finger cells of each block are coded such that a user may identify which combination of switches must be pressed and released to select the desired chord. Tentative sub-input choices may be made by pressing but not releasing, a combination of switches. If the chosen selection cell includes the name of a different grid, that successor grid replaces the current grid.

The display may be displayed on the computer monitor.

The present invention may be used for inputting Chinese or other foreign-based characters to computer user applications. For inputting Chinese characters, the method of character selection includes pinyin selection and hanzi selection. Pinyin selection includes initially selecting an appropriate pinyin initial, selecting an appropriate vowel cluster, and selecting an appropriate final/tone combination. Once the pinyin is selected, hanzi is displayed and selected.

Similar methods may be used for other languages.

The present invention can be used for word processing applications, for world wide web and virtual reality navigation applications, for structured application development and operating system interface applications, and for menu navigation in applications that use menus.

These and further and other objects and features of the invention are apparent in the disclosure, which includes the above and ongoing written specification, with the claims and the drawings.

BRIEF DESCRIPTION OF THE DRAWINGS

FIG. 10 illustrates an OHAI grid for OTIS (OHAI Text Input System).

FIG. 11 shows the OTIS grid task specification.

FIG. 14 illustrates using OTIS to input English text.

FIG. 16 is a chart of Mandarin Syllables.

FIG. 17 is a table of Pinyin counts.

FIG. 18 shows forty two hanzi with the same pinyin as "shi".

FIG. 20 shows TwinBridge prompt windows for 是.

FIG. 21 shows CHIME combined Pinyin initials and vowels.

FIG. 22 is an overview of CHIME.

FIG. 23 is a CHIME Pinyin chord sequence chart.

FIG. 24 shows the four CHIME chords to produce 是.

FIG. 25 shows the five CHIME chords for 黄.

FIG. 26 shows the two CHIME chords for 给.

FIG. 27 show examples of two chord hanzi.

FIG. 28 shows the three CHIME chords for 白.

FIG. 29 shows examples of three chord hanzi.

FIG. 30 shows the "Any Tone" grids for "shi".

FIG. 32 shows an OTIS data file diagram.

DETAILED DESCRIPTION OF THE PREFERRED EMBODIMENTS

WOH: THE WORKSTATION OHAI HANDSET

Figure 1:
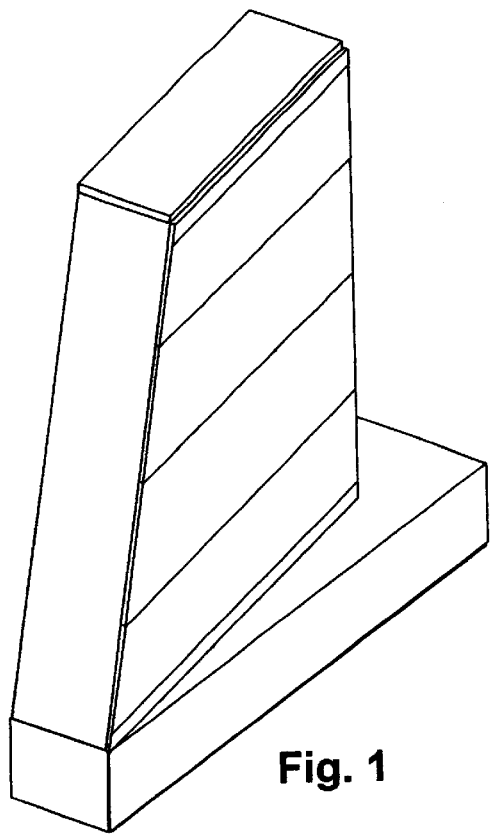
FIGS. 1–3 show side views of a (WOH) Workstation OHAI Handset.
Figure 2:
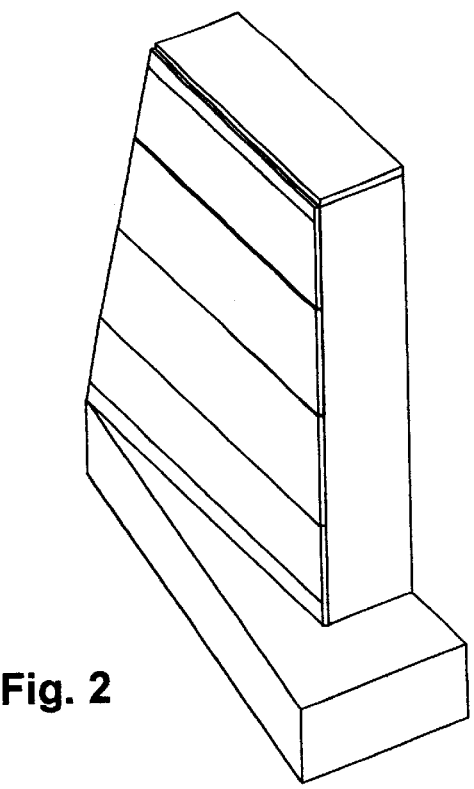
Figure 3:
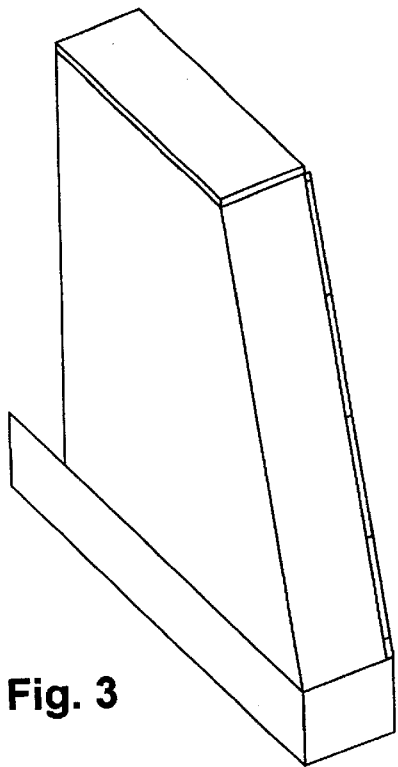
Figure 4:
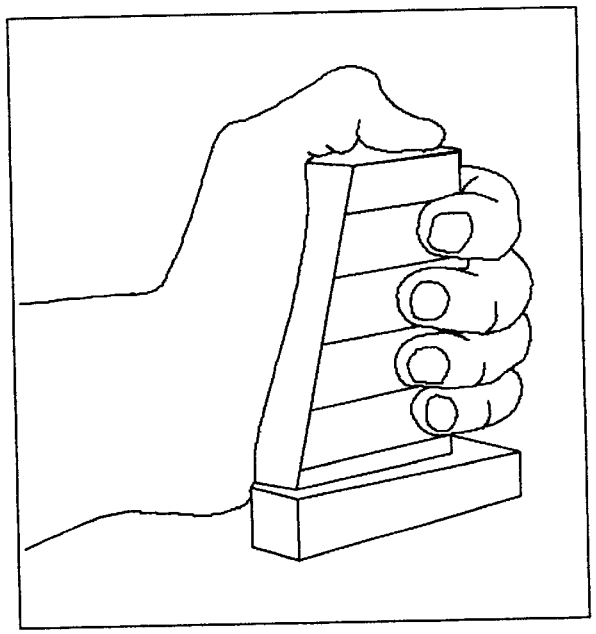
FIG. 4 shows a WOH grasped by a hand.

OHAI denotes one-handed input. The Workstation OHAI Handset 1 (WOH) as shown in FIG. 1 either replaces or coexists with the keyboard in the workstation user environment. FIG. 1 shows a preferred embodiment in which the handset 1 resembles a joystick and includes a base 2 and a key carrier 3 extending from the base. The key carrier includes a top surface having a single key 4 and a set of four keys 5,6,7,8 extending widthwise along a side surface. The keys are positioned such that when a user grasps the device as shown in FIG. 4, the user's thumb 10 rests on the top key 4 and the user's fingers rest on the set of four keys 5,6,7,8. Each key may be depressed using a single finger or thumb without removing or repositioning the digits.

This one-handed device serves the same function as the keyboard. The WOH in FIG. 1 is for use with the left hand. To use it, the user grasps it so that the little finger is on the lowest button, each successive finger is placed on the next highest button and the thumb is placed on top. To send input to user applications, he pushes and releases combinations of buttons. Typically, a user keeps one hand on the WOH and one hand on the mouse throughout his session. Although it is recommended that the WOH be the only text input device, and the keyboard discarded, it is possible to use all three devices simultaneously. Some examples where this might be desirable are in the early stages of transition from keyboard to WOH, or if two extremely different input sets are used at the same time. For example, the WOH can be set to send Chinese input while the keyboard is being used for English input.

With the WOH, the user never has to take his hand off the device, never has to take his fingers off the keys, and never has to take his eyes off the screen. The WOH guides the fingers to their proper position and the pressable surfaces extend the full length of a face of the device, so no time or effort is wasted positioning the fingers. Since it has only five keys, the fingers don't move from key to key, so it is never necessary to remove the eyes from the user application. The design of the WOH alleviates many of the factors contributing to repetitive motion disorders such as carpal tunnel syndrome. The dimensions can be easily and inexpensively customized to individual users.

Additionally, a one-handed device frees up the other hand for other uses: mouse manipulation, telephoning, or holding the morning coffee cup.

The WOH is ideally suited to the workstation user environment either as an enhancement to, or as a replacement for, the keyboard. As an enhancement, it takes up very little room (less than a mouse, and considerably less than a mouse pad). The shape of the WOH allows it to be placed out of the way easily when not in use. The device is lightweight (approximately same as a mouse), so it can be picked up and used as well as being used with the forearm resting on the working surface. Under either circumstance, it can be positioned and repositioned to relieve stresses that contribute to repetitive motion disorders. In addition to benefits as an enhancement, as a keyboard replacement it frees even more surface area and provides more freedom of movement for the user.

The advantages of WOH in the workstation user environment are simplicity, comfort, and freedom to reposition in three dimensions as well as rotation. In short, the user can position it in any manner to suit. Moreover, it takes little physical exertion to use and does not require looking at to correctly position fingers on the device. Other forms of the device are equally well suited to other computing environments and will be disclosed hereafter.

HOW TO USE THE HANDSET

As shown in FIG. 4, the user holds the WOH so that the thumb rests on the top key, and the fingers rest on the four remaining keys. To select an input, the user presses and releases a combination of keys. Each combination is called a chord and the act of pressing and releasing a combination is called chording. There are only 31 chords, and mastering them with an OHAI training game takes only 1–3 hours (in contrast to the 100+ hours it takes to achieve partial mastery of a QWERTY keyboard).

OHAI NOTATION and VOCABULARY

Each chord can be represented notationally by a series of circles with darkened, numbered circles indicating pressed fingers and clear unnumbered circles indicating unpressed fingers. Since the example handset is left-handed, leaving the right hand free for precision mouse work, the fingers are numbered so that:

❶=Pressed Little Finger
❷=Pressed Ring Finger
❸=Pressed Middle Finger
❹=Pressed Index Finger
❺=Pressed Thumb The chord consisting of all fingers (the full chord) is represented ❶❷❸❹❺, a chord consisting of just the thumb is ○○○○❺, a chord consisting of the little finger, index finger and thumb is ❶○○❹❺. Other chords are notated in like manner.

Each chord represents either an input choice or one in a sequence of sub-inputs, which taken together specify an input (like pressing the SHIFT or CAPLOCK key on the keyboard before pressing the letter to be capitalized). An OHAI window (as shown in FIG. 5) coexists with user applications windows on the workstation screen (see FIG. 7) to give the user chording instructions.

Figure 5:
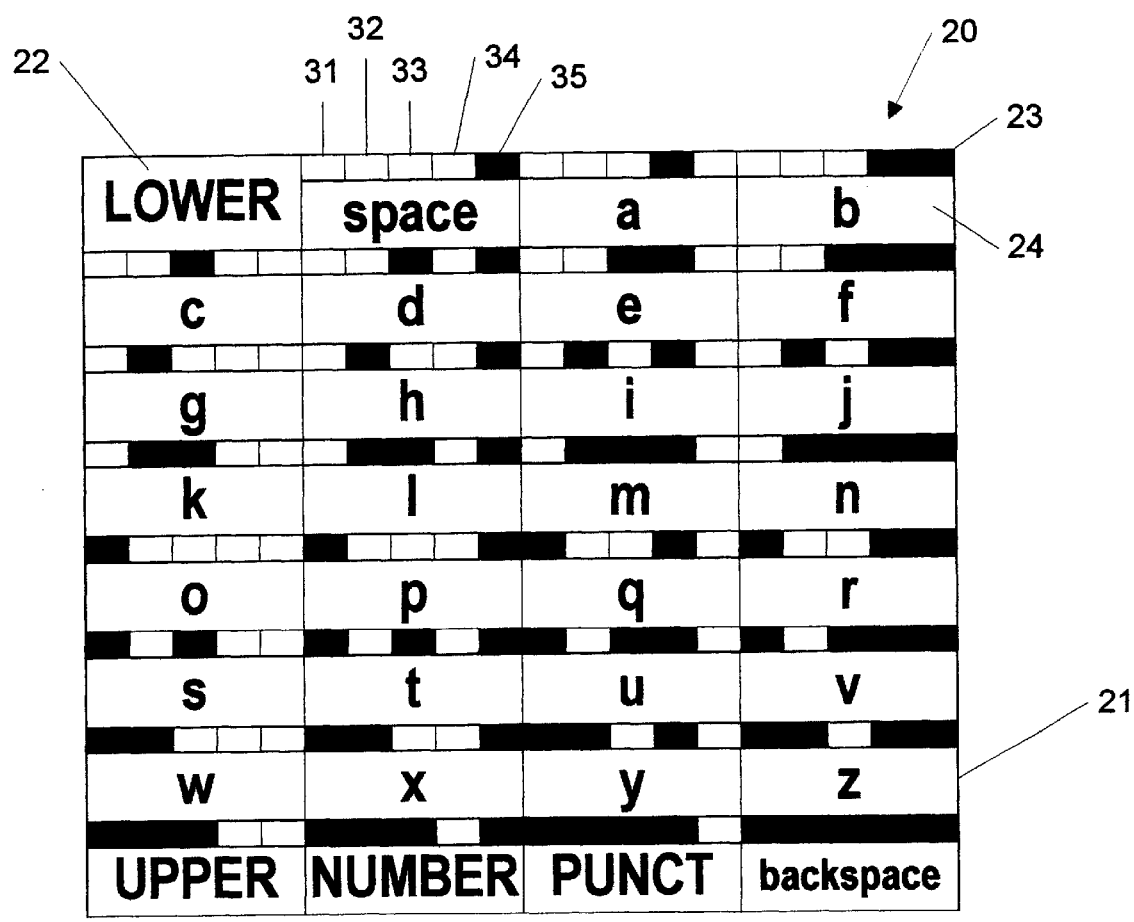
FIG. 5 shows an OHAI grid for English text input
Figure 6:
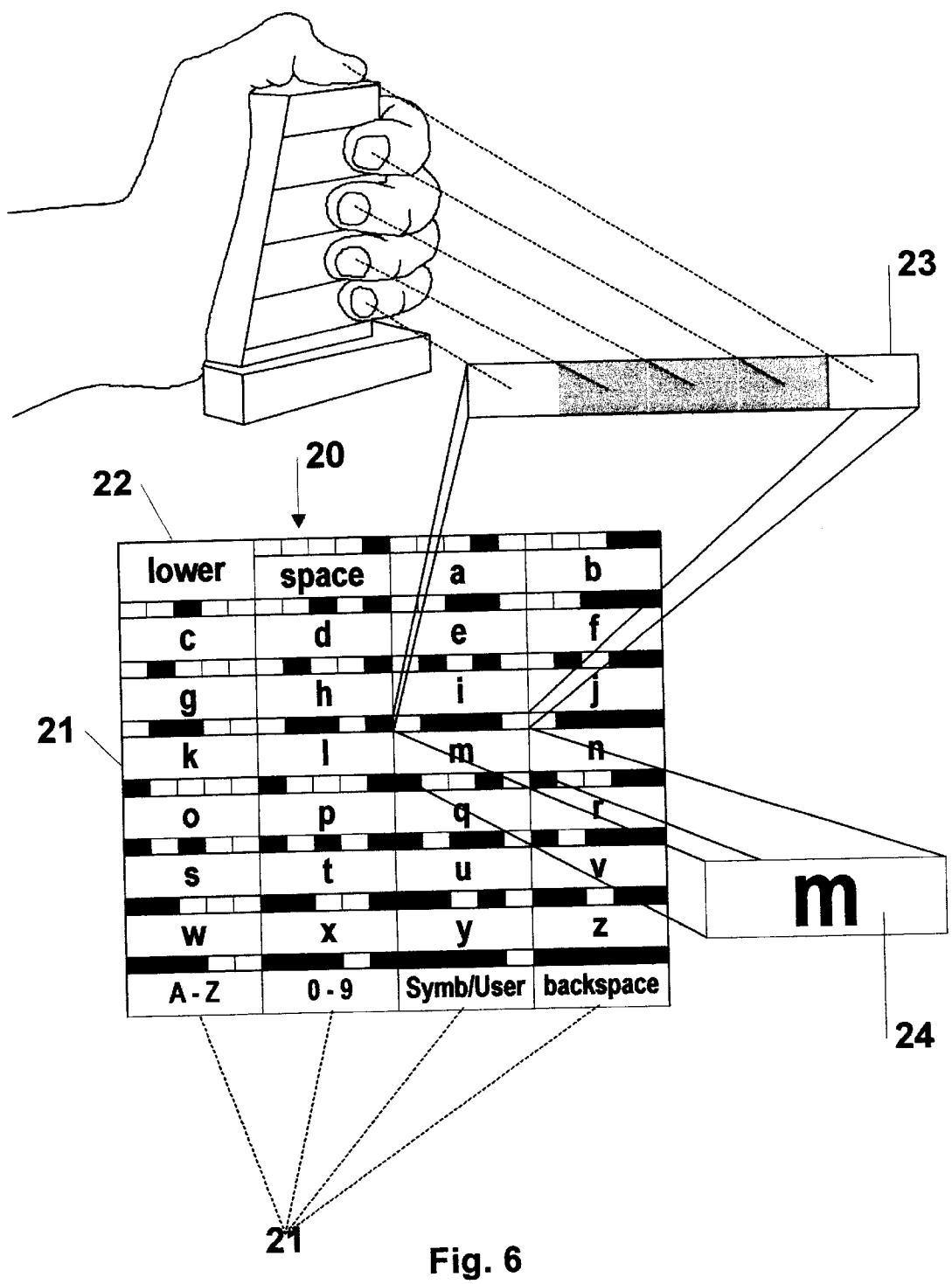
FIG. 6 explodes a chord block of an OHAI grid and shows the relation between finger cells and the workstation OHAI handset.

To show the user how to use the WOH, the OHAI window displays one of a number of OHAI grids which associate chords with user application inputs (as shown in FIG. 5). FIG. 6 breaks out and labels the parts of an OHAI grid for alphanumeric input.

As shown in FIG. 5, the grid 20 is a 4×8 arrangement of thirty two blocks 21. The upper left block 22 is the name block and gives the grid name which provides an overview of the choices presented by the grid. The remaining thirty one chord blocks 21 have two parts: a row 23 of rectangles on the top called the chord may containing five finger cells 31,32,33,34,35 and a larger rectangle 24 below called the selection cell.

In each chord block 21, the finger cells 31,32,33,34,35 are either dark or clear. A dark finger cell indicates a finger to be pressed and released. A clear finger cell indicates an unpressed finger. For example, a chord map consisting of all five darkened finger cells (▓▓▓▓▓) represents the full chord (❶❷❸❹❺), a chord map with the first, fourth and fifth finger cells darkened (▓☐☐▓▓) indicates the chord ❶○○❹❺, and in the grid 20 shown in FIG. 5 designates the lower case letter "r". Other chords are similarly indicated by chord maps.

Figure 7:
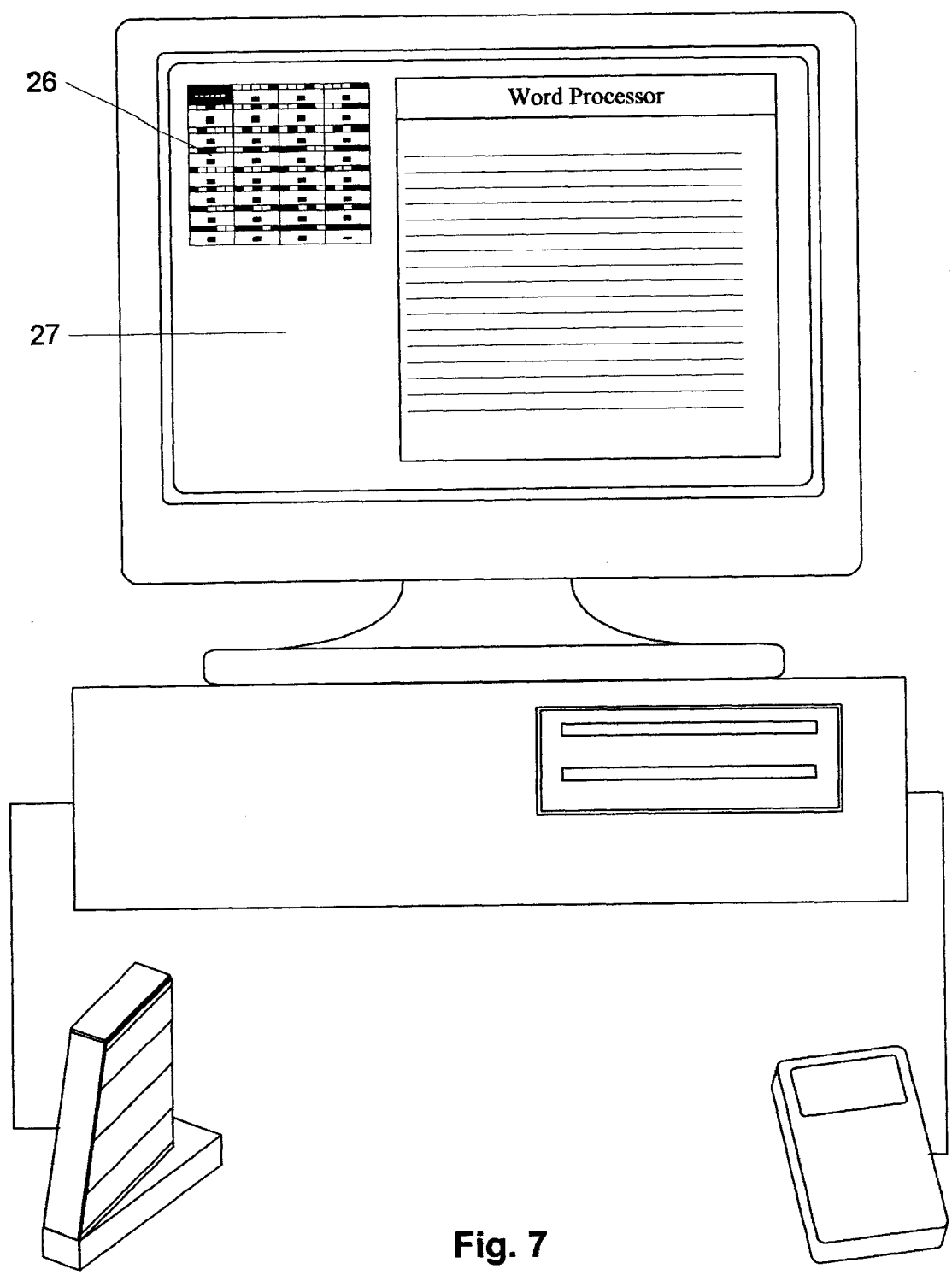
FIG. 7 is a workstation showing an OHAI window and a handset.

The range of input and sub-input choices immediately available is given by the grid currently displayed in the OHAI window. FIG. 7 shows for example, an a–z grid 26 displayed on a computer monitor screen 27. The selection cell indicates to the user what will happen when the chord in the chord map above it is chorded (pressed and released). Tentative (pressed, but not released) input choices are indicated by highlighted selection cells corresponding to unreleased chords.

OHAI APPLICATION TYPES

One of many disadvantages with previous implementations of chord-based input systems is that they only allow English text input. In contrast, OHAI applications associate chord-sequences with any user input set, or multiples thereof. This is especially useful in those tasks for which the keyboard is inappropriate to the input set, such as Chinese and Japanese text processing and world wide web (WWW) and virtual reality (VR) navigation. In addition, OHAI carries with it the possibility of a unified user interface which provides a single mechanism to combine the functionalities of toolbars, pull-down menus, accelerator keys, and dialog boxes. These concepts fall into three intuitive categories of user application: word processing in any language is an example of an input-intensive user application; WWW Navigation is an example of content/choice user application; structured application development and operating system interfaces are examples of option-intensive user applications. Formal definition of these three categories is outside the scope of this disclosure; in general a word processor is distinct from a web-browser is distinct from a software development suite with respect to the choices their users make when using them. Each of these user application categories has a corresponding type of OHAI application.

Figure 8:
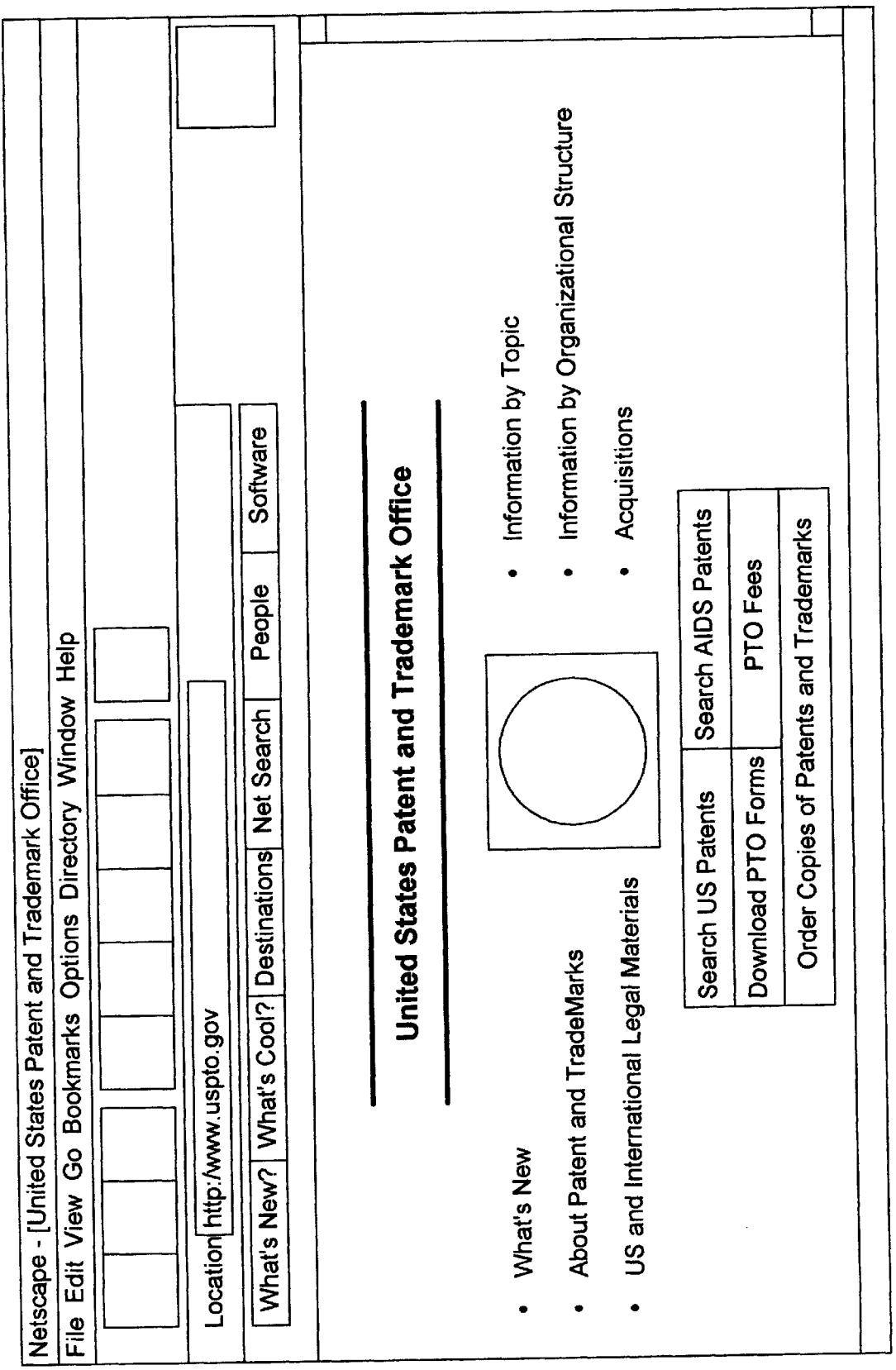
FIG. 8 shows a WWW application window.
Figure 9:
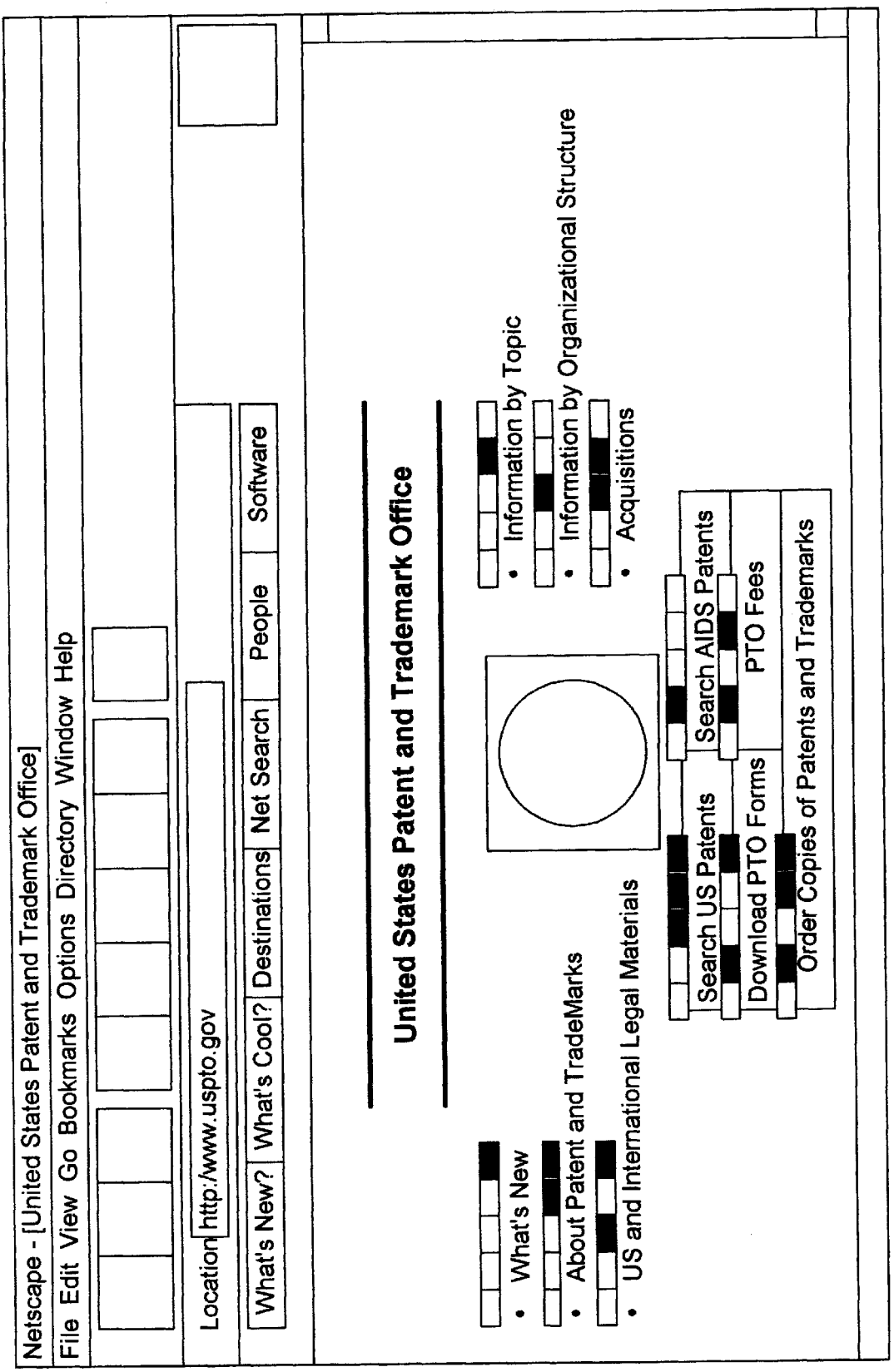
FIG. 9 shows a WWW application window with OHAI Chordmap overlay.

OHAI applications fall into three general types: OHAI gridset applications, OHAI chordmap arrangements, and OHAI-based interfaces. OHAI gridset applications are used for input intensive user applications such as word-processors and spreadsheets. With OHAI Gridset Applications, the workstation screen has both an OHAI window and a user application window (FIG. 7). The user application window is maintained by the user application. The OHAI window is maintained by the OHAI processor software and displays one of a number of the grids which comprise the OHAI gridset application. OHAI chordmap arrangements are used for choice intensive applications such as WWW and VR navigation in which the user application presents options like WWW links or VR gestures. With OHAI chordmap arrangements, the user application window (FIG. 8) is overlaid with chordmaps (FIG. 9) which provide chord shortcuts to the choices presented therein. OHAI-based interfaces are complete user applications whose method for interacting with users are OHAI gridsets and chordmaps rather than the variety of user interface elements in Windows-Icons-Menus-Popups (WIMPS) applications; an example is ODS, which enables users to create and modify OHAI applications. Some examples of OHAI applications, and their types, are:

OTIS (OHAI Gridset Application, OHAI Text Input System)

CHIME (OHAI Gridset Application, CHinese Input Method)

HAJIME (OHAI Gridset Application, HAnd-based Japanese Input MEthod)

OWN (OHAI Chordmap Arrangement, OHAI Web Navigation)

OVR (OHAI Chordmap Arrangement, OHAI Virtual Reality)

OMI (OHAI Gridset Application, OHAI Mouse Interface)

ODS (OHAI Based Interface, OHAI Development System).

In OHAI gridset applications, such as OTIS and CHIME, the OHAI window displays grids whose form remains constant; there is always a name block and thirty one chord blocks each showing a chord map and a selection cell. Only the contents of selection cells change. For OTIS, the selection cells contain English text inputs and sub-inputs; for CHIME, they contain Chinese text inputs and sub-inputs. The sub-inputs are indicators of successor grids showing sequential input subsets. If the selection cell contains an input, such as a text character, that input is sent to the user application when the chord in its corresponding chord map is chorded. If the selection cell contains the name of a different grid, that successor grid replaces the current (predecessor) grid in the OHAI window, giving the user a further set of selection cell choices. Some selection cells both cause input to be sent to applications and have successor grids.

These concepts are illustrated by OTIS—a sample OHAI Text Input System.

OTIS: AN EXAMPLE OHAI APPLICATION

Introduction to OTIS

Almost every user application accepts and processes English text input. This means that an input system must have the ability to send the applications lowercase letters, uppercase letters, Arabic numbers, punctuation, and common symbols. OTIS is a sample (and modifiable) OHAI gridset application which accomplishes these input goals. This section presents and describes the components of OTIS, shows how to use OTIS, and then presents some design considerations and advantages, as well as some alternative layouts.

OTIS Description

The OTIS application comprises grids (FIG. 10), each of which accomplishes specific tasks. FIG. 11 defines the primary and secondary input tasks associated with each grid. The first, or base, grid for OTIS is the LOWER grid. The LOWER grid shows the user which chords input lowercase letters, spaces, and backspaces, as well as which chords select other grids. For example, the ○○○○● chord inputs a space, ○❷❸❹○ inputs lowercase 'm', ❶❷❸❹❺inputs backspace, and ❶❷❸○○ selects the UPPER Ad fi grid for capitalization. The chords for lowercase letters, space, and backspace have no successor grid; when these are chorded, the LOWER grid remains in the OHAI window. The chords for UPPER, NUMBER, and PUNCT all have successor grids named by their selection cells. These allow the user to choose from input sets of uppercase, numeric, or symbol characters. The ability to quickly choose a capital letter demonstrates the utility of successor screens. If the user wants to input a capital 'O', he will chord ❶❷❸○○ to bring up the UPPER grid, and then chord ❶○○○○ for 'O', after which its successor grid (LOWER) win replace the UPPER grid. OTIS behaves similarly for input of single numerals (the NUMBER chord block and grid) and symbols (the PUNCT chord block and grid).

Figure 12B:
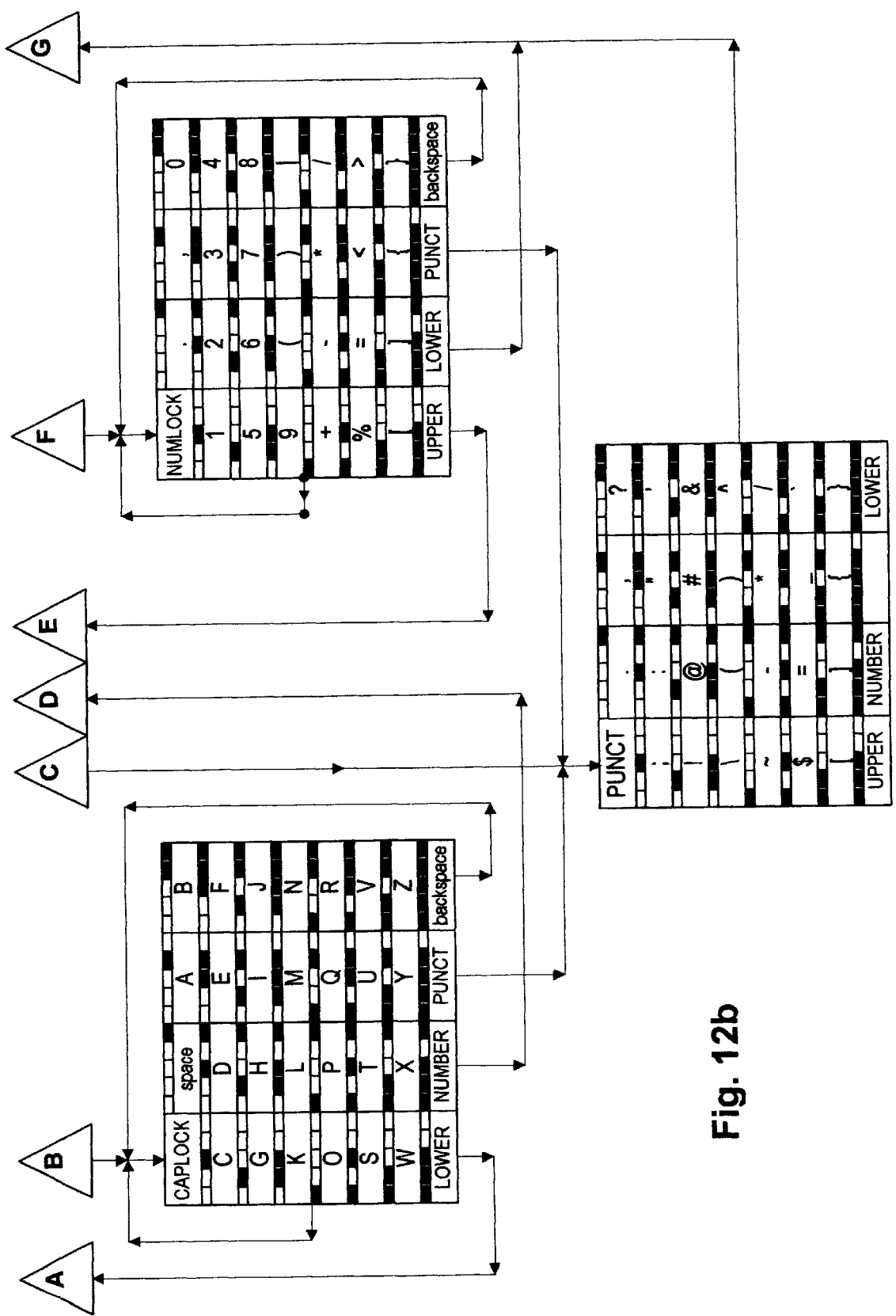
FIG. 12 shows the OTIS successor grids.

FIG. 12 explicitly shows the relationships between selection cells and their successor grids. The arrows in FIG. 12 show successor grids for each chord. Since arrows from each chord block would be confusing, the figure uses arrows from the side of the window to indicate the successor grid for all chords in a grid not explicitly indicated. For example, the arrows from the LOWER grid show that most of the chords have the LOWER grid itself as a successor grid, and the arrows from the UPPER grid show that all chords have different successor grids; in most cases LOWER. These are examples of selections that both cause input and have a successor grid. The LOWER and UPPER selection cells themselves being examples of selections which have successor grids (which they name) but cause no input.

Figure 13:
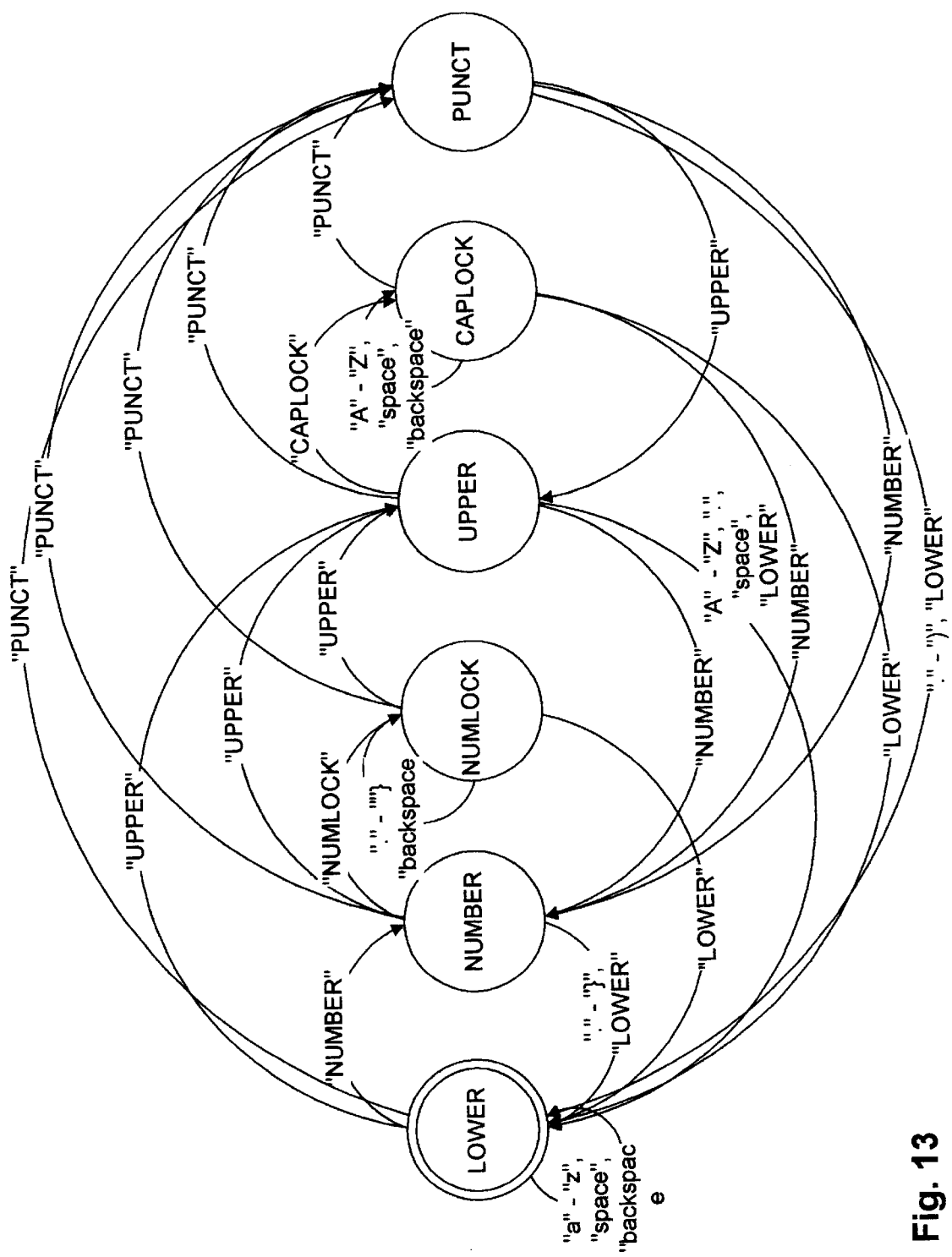
FIG. 13 shows OTIS finite state automaton.

Because FIG. 12 can be confusing, FIG. 13 is another representation of the same information. Each circle corresponds to an OTIS grid, the labels on each arc indicate inputs which OTIS will send to user applications when they are chorded, each arc goes to the successor grids for these inputs.

Using OTIS

FIG. 14 shows how to chord the phrase "the OHAI handset". Column 1 shows the contents of the OHAI window, column 2 shows chords, column 3 shows selections for the chords, column 4 shows the contents of a user application window after a chording sequence, column 5 shows keyboard keys corresponding to the chords. To send the text to a user application, chord ❶○❸○❺, ○❷○○❺, ○○❸❹○ and ○○○○❺ to input characters 't', 'h', 'e', and a space. Chord ❶❷❸○○ twice to select the UPPER grid followed by the CAPLOCK grid. Chord ❶○○○○, ○❷○○❺, ○○○❹○, ○❷○❹○ for "OHAI". Chord ❶❷❸○○ a third time to remove CAPLOCK and return to the base grid. Chord ○○○○❺ to input the space after "OHAI". Finally, chord ○❷○○❺, ○○○❹○, ○❷❸❹❺, ○○❸○❺, ❶○❸○○, ○○❸❹○, ❶○❸○❺ for "handset".

OTIS Design Considerations & Advantages

Some of the issues to consider in designing OHAI gridset applications are: sequence minimization, intuitive chord-input association, input locatability, related function chord mapping, and chord difficulty.

Sequence minimization means that each input in a gridset should be accessible from the base grid (and as many other grids as possible) using the fewest sequential chords. FIG. 12 shows that OTIS minimizes sequence size by placing the names of other grids in the lower left three selection cells. This makes all grids accessible to all the others by at most two chords, so that all inputs result from at most two chords from the base. Moreover by putting the most common inputs (lowercase letters) on the OTIS base grid, the most common inputs result from one chord.

An example of intuitive chord-input association is the association of "space" with the ○○○○❺ chord, which is produced using only the thumb in a left handed handset; not only is this an easy chord to produce, but this also corresponds to how "space" is input with a keyboard.

OTIS optimizes input locatability by showing the LOWER, UPPER, and CAPLOCK inputs in alphabetic order, the NUMBER and NUMLOCK inputs in numeric order, and by attempting to put the most frequently used symbols first in the NUMBER, NUMLOCK, and PUNCT grids.

Related function chord-mapping is exemplified not only by the uppercase letters being produced by the same chords as their lowercase counterparts, but also by the same chord being used to switch to UPPER, and then if necessary to CAPLOCK, and then again back to LOWER. To see this, note that ❶❷❸○○ chorded once allows a single uppercase letter to be input using the same chords as for lower case letters via the UPPER grid. Chording it twice allows a series of uppercase letters to be input using the same chords via the CAPLOCK grid. Chording it a third time returns to lowercase input with the LOWER grid. The ❶❷❸○❺ chord behaves similarly for numbers and math symbols.

One of the benefits of a well-designed OHAI gridset application is that user dependence on the OHAI window wanes over a short period of time. When the chords are memorized, the user can ignore the OHAI window completely and focus entirely on the user application; at this point, the OHAI window can be removed from the screen, or remain for reference purposes. Thus, due to its continuous visual feedback and the small number of chords, OHAI is self-training. The self-training aspect of a well-designed OHAI gridset application is even more necessary in CHIME and HAJIME due to the large numbers of characters for Chinese and Japanese.

User Customization of OTIS

An input system which produces only alphanumeric input and forces the user to a single set of chord-text associations is of limited use, so a way to add and rearrange inputs must be provided. Indications of two kinds of customizations, extensibility and rearrangement are discussed here briefly.

Extensibility means providing additional inputs; one way of extending OTIS is to assign a user-defined successor grid to the blank selection cell for the ●❷❸❹○ chord in the PUNCT grid. For example, if the user uses Chinese or Japanese characters in his task, he can assign the base grid of CHIME or HAJIME to this block, thus Chinese or Japanese input is two chords away from the base grid for OTIS.

Rearrangement means reassigning inputs to chords and reflecting the reassignment in OHAI gridset application grids. Grid layouts other than those described in this application are possible. The layouts in this application are designed to minimize input location time and maximize memorizability for a "typical" user. A more specialized user—say a novelist—may decide to put the most commonly used characters on the base grid and less commonly used characters on a successor grid. Thus 'q', 'x', and 'z' may be swapped with the characters for period (.), comma (,) and double quote ("). Another obvious optimization involves research to determine which chords are most difficult for the user (either a "typical" user or specific users). Once this determination is made, the most frequently used letters can be associated with the easiest chords, thus sacrificing short-term locatability for long-term ease of use, an obvious application for users prone to repetitive motion disorder.

Practical Uses of OTIS

Figure 35:
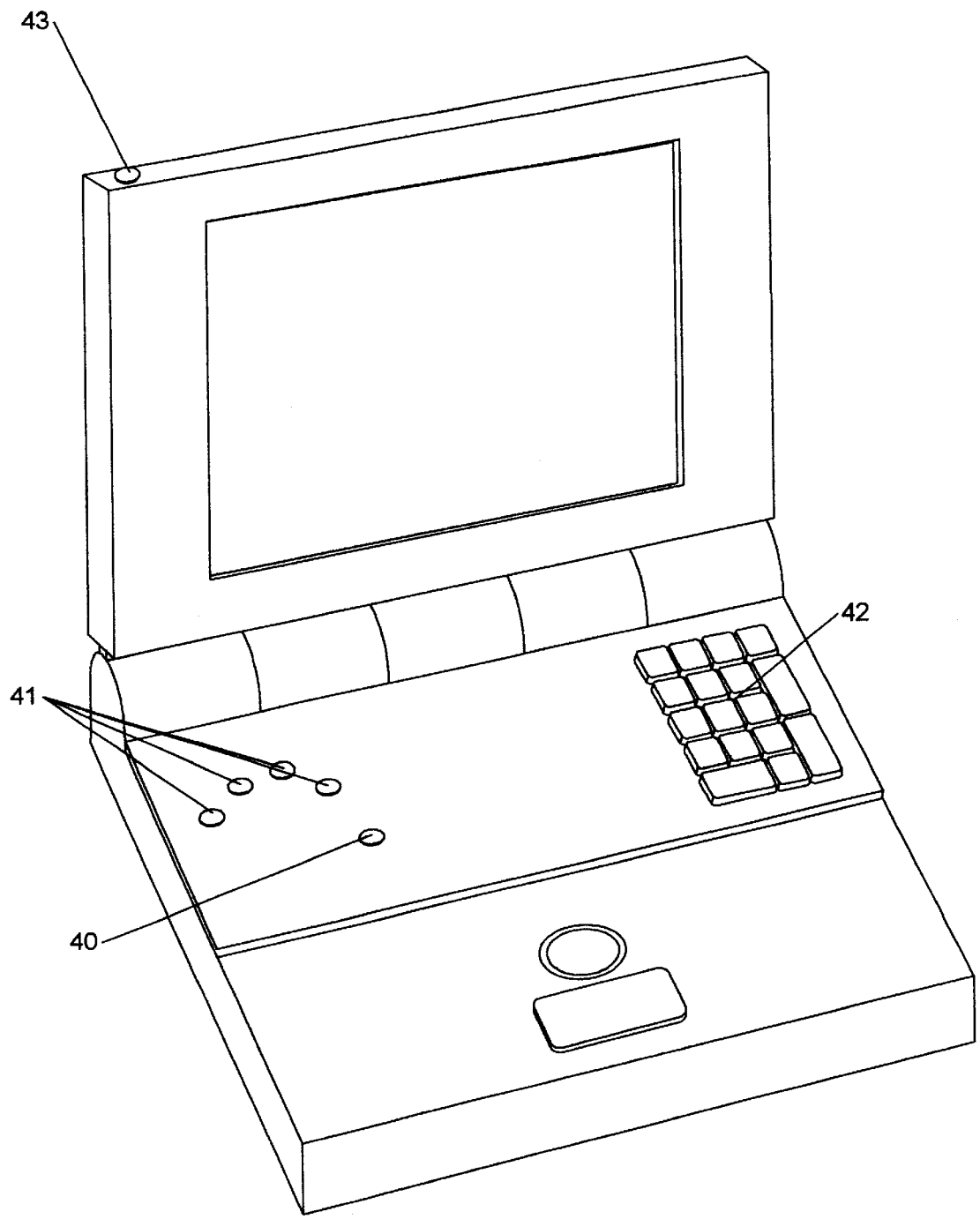
FIG. 35 is a front view of a laptop with OHAI capability.
Figure 36:
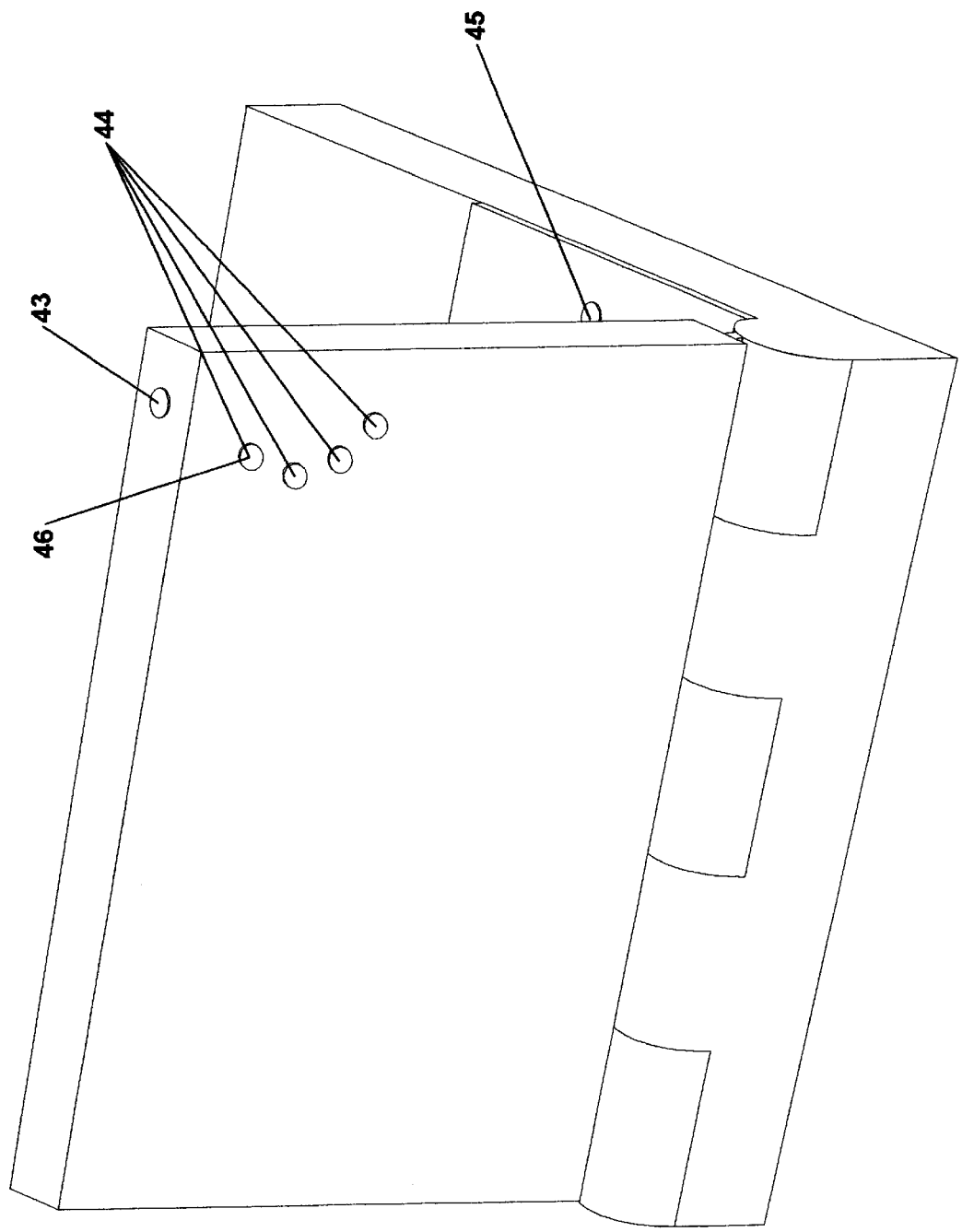
FIG. 36 is a back view of the OHAI laptop of FIG. 35.

OTIS is a sample OHAI application to illustrate OHAI concepts, not an argument for OHAI replacing the keyboard for English text input in the workstation user environment. Most people who do English text input exclusively are already accustomed to the keyboard. The obvious benefits of OHAI over the keyboard for English text input occur in other user environments; for instance, the keyboard adds weight and moving parts to a hand-held computer, so for English text input to one of these devices, an OHAI device consisting of five ergonomically placed buttons on its housing (as illustrated in FIGS. 35 and 36) has advantages in terms of usability, weight, and cost over a miniature keyboard. OHAI usage in the workstation user environment for English text input is desirable only when there is a reason not to use a keyboard; such as space saving, portability, physiological and workflow benefits, and so forth.

THE OHAI INPUT SYSTEM IN GENERAL

In the OTIS example, the WOH device and the OTIS application work together in the workstation user environment to allow the user to input English text with one hand. It should be kept in mind that the WOH is a specific OHAI device and OTIS is a specific OHAI application. The two changeable components of this scheme are the OHAI device and the OHAI application. The device varies to suit the user environment, and the OHAI application varies in both form and content with the nature of the input desired. the WOH is suited to the desktop user environment and OTIS is suited to English text input. Other OHAI devices and OHAI applications are suited to other user environments and purposes.

Figure 15:
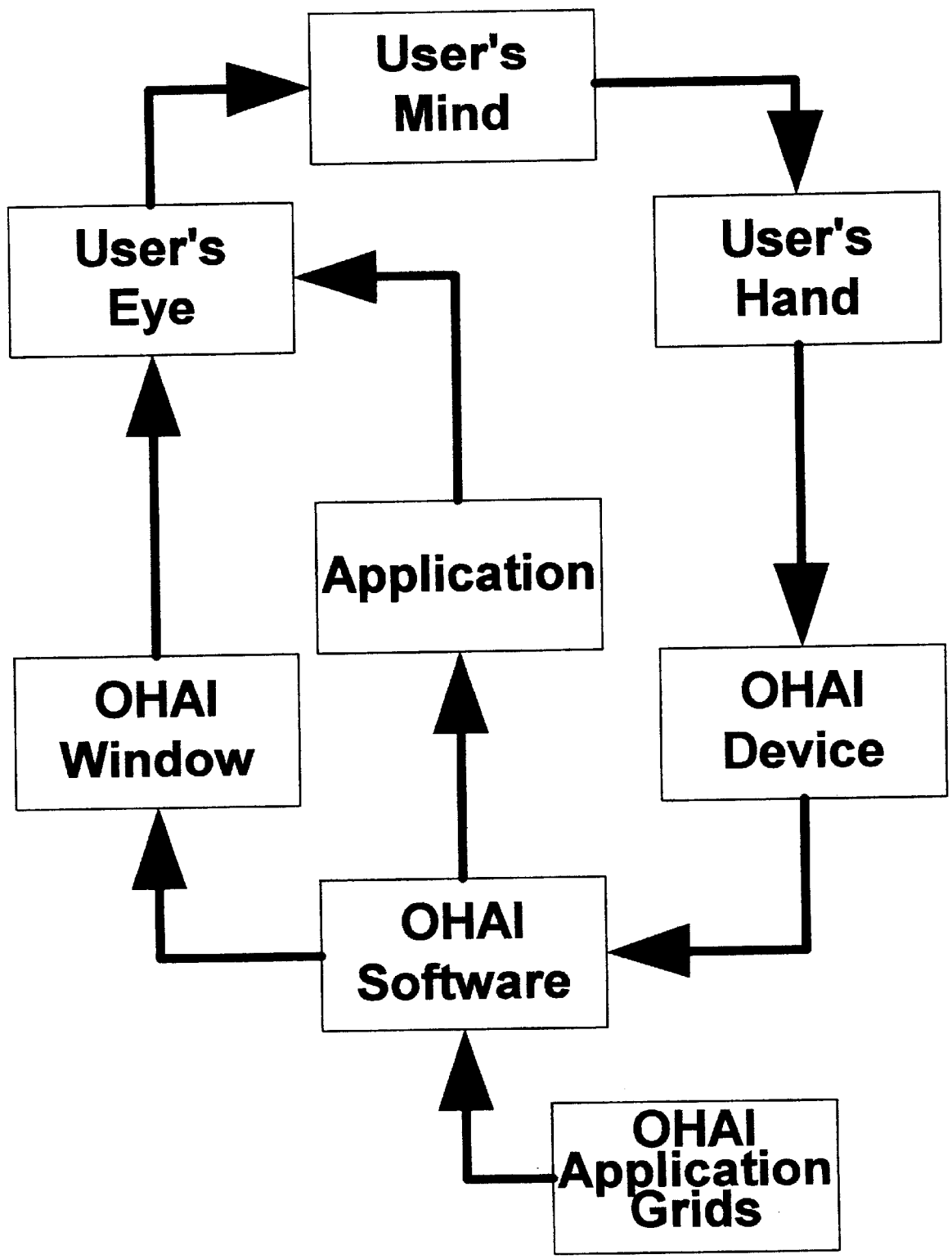
FIG. 15 shows OHAI system information flow.

OHAI devices and applications are components of the OHAI system, as illustrated in FIG. 15 which shows pathways for OHAI system information flow. In FIG. 15, the path from "OHAI Applications Grids" to "User's Eye" represents an OHAI application being used by the OHAI software to inform the user, via a window or chordmaps, how to produce inputs and sub-inputs. Simultaneously, the user application's window presents the user with options (e.g. a document which requires an input choice). The path from "User's Hand" to "OHAI Software" represents the user manipulating the device to choose inputs or sub-inputs. The OHAI software, using OHAI application grid information, interprets signals sent from the device and updates the contents of the window to ensure that the OHAI window keeps the user informed of both his tentative input choice (through highlighting) and his current input choices (through grid-swapping or chordmap overlaying). When an input is completely chorded, it is sent to the user application, and the process repeats.

The presence of the window and the nature of the handset eliminate two factors which work against other implementations of chord-based input systems. Instead of forcing the user to memorize associations of chords with inputs, the OHAI window informs how to achieve the desired input. By having strictly five keys, the OHAI handset eliminates the finger travel implicit in the e.g. QWERTY, Twiddler, and BAT keyboards.

DESCRIPTIONS OF OHAI APPLICATIONS

CHIME: The OHAI Chinese Input Method

The most immediately obvious benefit provided by OHAI is with input sets unsuited to the QWERTY keyboard, as with Chinese text input. More than one quarter of the world's population speak Chinese. An increasing number of these use computers in their day to day lives. It is desirable that these users be able to input Chinese characters to user applications.

The Chinese Input Problem

Depending on the authority cited, the number of Chinese characters (hanzi) ranges from the thousands to the tens of thousands. It is generally agreed that the number in modern usage does not exceed ten thousand. Even with only ten thousand hanzi, it is a technical challenge to minimize user effort in selecting them to be input to user applications.

In addition to the sheer number of hanzi, each is internally complex, being comprised of from one to twenty-nine strokes.

Another factor contributing to the complexity of devising an easy to use input method for ten thousand internally complex hanzi is the lack of a single organizing principle. Each hanzi has many graphical attributes which are used to classify and organize them in e.g. dictionaries; these organizing and classifying attributes include constituent strokes, constituent parts, stroke order, stroke count, and "radicals", which are a finite set of cognitively primary constituent parts. Although some very clever input methods have been devised utilizing graphical attributes of hanzi, these force the user to memorize a tremendous amount of information, take essentially the same amount of time to input hanzi as to write them by hand, or involve specialized expensive hardware, and so have failed to gain popular usage.

The problem is to devise a system for the selection of hanzi which takes advantage of preexisting knowledge about hanzi, minimizes additional required learning, and, once learned, takes less time and effort to use than the actual writing process. If additional hardware is required, it should be inexpensive and useful for additional purposes.

Chinese Input Solution Strategy

The input methods which demand the least effort on the part of the user take advantage of the fact that, although there are of the order of ten thousand hanzi, the number of pronunciations is an order of magnitude smaller (in Mandarin there are only one thousand two hundred and seventy nine pronunciations). These input methods allow the user to narrow the selection of hanzi by first selecting the pronunciation and then selecting from among the range of hanzi with that pronunciation. The most popular methods implement the pronunciation specification phase in this process using the pinyin pronunciation representation system, so before showing how these systems work, a summary of pinyin is apposite.

Précis of Pinyin Romanization

Pinyin, the most widespread method of representing pronunciation, is taught in elementary schools in all countries which teach Chinese as part of the standard curriculum. It uses the Roman alphabet and either diacriticals or numerals to represent Mandarin pronunciations.

Pinyin representations optionally start with one of 21 consonant sounds:

b, p, m, f, d, t, n, l, c, s, ch, sh, r, j, q, x, g, k, h

In CHIME the option not to have an initial consonant sound is itself treated as an initial and is denoted 'ø'. Regardless of how they start, all pinyin have one of nineteen vowel combinations:

a, o, e, -i, er, ai, ei, ao, ou, i, ia, ie, iou, u, ua, uo, uai, uei, üe

Although they use the same letter, '-i' and 'i' sound different; '-i' resembles the vowel sound in English "is" and 'i' resembles the vowel sound in English "she". If there is no optional consonant prior to the vowel cluster, multi-letter vowel clusters starting with 'i' or 'u' are substitute 'y' and 'w' respectively in written pinyin. Hence, "ya-", "yao", "you", "yo-", "ye", and "wa-","wo", "wai", "we-".

In addition to the optional initial consonant sound and the mandatory vowel cluster, there are two optional endings:

-n, -ng

In CHIME the option not to have final is itself treated as a final and is denoted Most pinyin have one of four tones: the first tone is high and level, the second tone is short and rising, the third tone is long and falls then rises slightly. The fourth tone is short and falling. The absence of tone is sometimes referred to as the neutral tone and is short and neither rises nor falls. Each of the non-neutral tones is indicated by a numeral following the letters, or by a diacritical mark over the principle vowel in the vowel cluster:

ma1, ma2, ma3, ma4, ma or mā, má, mǎ, mà, ma

The neutral tone is sometimes indicated by an O or ø following the syllable or by an ° or over the principal vowel. The absence of a diacritical or following number is also sometimes used to indicate that the tone is unknown or not relevant.

It is useful to distinguish between syllables and pinyin; for the purposes of this section, pinyin denotes complete pronunciations including tone, and syllable denotes the pronunciation without tone. For example, "ma" is a syllable, "ma1" and "mā" are pinyin, and 媽 {"mother"} is a hanzi.

FIG. 16 shows all of the combinations of initials, vowel clusters, and finals that comprise Mandarin syllables. Note that not all possible combinations of initials, vowel clusters, and finals actually exist.

FIG. 17 shows how many of the pinyin derived from the syllables in FIG. 16 exist in the dictionary we used as reference. Note that not all possible pinyin actually exist.

Using Pinyin to Select a Range of Hanzi

To illustrate pinyin-based input methods, consider input of the single Chinese hanzi 是 {"shi4" "is"}. As shown in FIG. 18, 是 30 is one of some forty two hanzi with the same pinyin.

To input 是, the user begins by choosing "s-h-i-4". The software implementing the input method then uses some visual means to present the hanzi and allow the user to select among them.

The means for "choosing" pinyin and the visual means for presenting the hanzi once the pinyin has been specified vary widely among implementations of Chinese input methods.

Example Keyboard Implementation

One of the most popular pinyin-based input methods is TwinBridge Software Corporation's Chinese Partner®, which translates keyboard keystrokes to hanzi. Although Chinese Partner is a very popular and very useful application, the nature of the keyboard and the input task render touch-typing impossible. To see this, take the task of selecting 是 for input.

Figure 19:
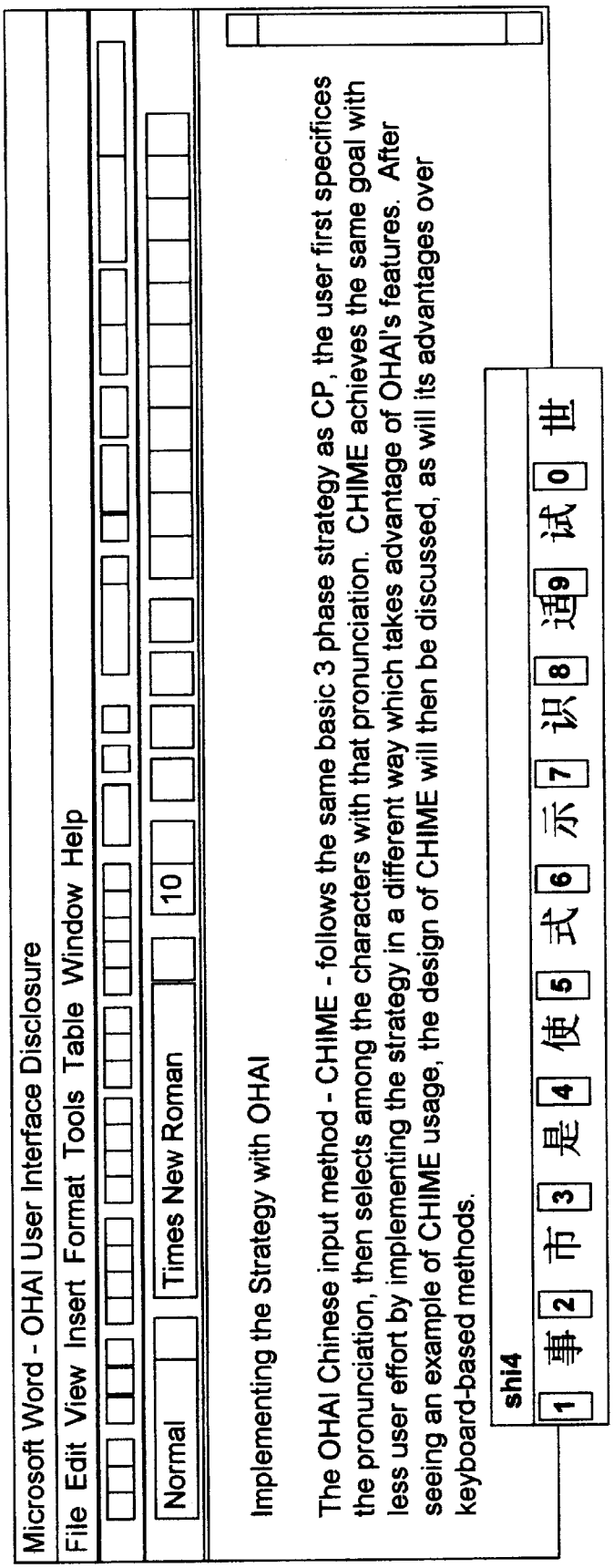
FIG. 19 shows the first TwinBridge prompt window for 是.

The user indicates the pinyin by typing "s-h-i-4" using the corresponding keys on the keyboard, then looking at the TwinBridge prompt window (FIG. 19) to see if it is one of the ten hanzi displayed. If the hanzi is displayed, one of ten function keys is pressed to indicate which hanzi is to be sent to the user application. If the hanzi is not displayed on the first prompt screen, then the arrow keys must be used to display a different set of ten hanzi with the same pronunciation within the prompt window (FIG. 20). When the hanzi does appear, one of the ten function keys is used to select it.

The process is similar for all hanzi. Using Chinese Partner, the average user types a minimum of five keys to specify a single hanzi, an average of seven, and, assuming he spots the hanzi on the first pass, a maximum of twelve. If he misses the hanzi in the prompt window as he is using the arrow keys, he must use the arrow keys to go back through previous screens to locate the hanzi, thus adding keystrokes. Missing the hanzi on the first pass through the prompt screens is fairly common due to the constant need to switch visual focus and attention among the keyboard, the prompt screen, and the user application.

Chinese Partner is among the most efficient Chinese text input systems for the keyboard, its unwieldiness is due only to the nature of the task to which it is set, namely attempting to use for Chinese input a device intended originally to slow down the input of English text.

OHAI Implementation

CHIME—the OHAI CHinese Input MEthod—improves upon the basic two phase strategy used by Chinese Partner: the user first specifics pinyin, then selects among the hanzi for that pinyin. CHIME achieves the same goal with less user effort by modifying the Chinese Partner's strategy to take advantage of OHAI's features. This section shows how to use CHIME and then presents some design considerations and advantages, as well as other uses for the same interface.

Using CHIME for Chinese Input

OVERVIEW OF CHIME

Like OTIS, CHIME consists of grids which are swapped in and out of the OHAI window. These grids lead the user through the process of selecting hanzi to be input to user applications. All hanzi can be chorded in from two to five chords.

Like Chinese Partner, the process of selecting a hanzi occurs in two phases: the pinyin selection phase and the hanzi selection phase. The pinyin selection phase has three stages or junctures, each defined by what is displayed in the CHIME grid for that juncture. These are: initial (or base) juncture, syllable juncture, and pinyin juncture. CHIME pinyin phase junctures are represented in FIG. 22 and FIG. 23. The hanzi selection phase consists of one juncture for the vast majority of cases, and, only when the user does not know a hanzi's tone, more than two; where necessary hanzi junctures are distinguished by number.

At the initial selection juncture, the OHAI grid displays all pinyin initials including "ø/w/y' (to allow the user to indicate that there is no initial consonant for the desired hanzi). Note that some selection cells contain more than one initial, and some contain two-letter initials. To input 是, the user begins by chording ○❷❸❹❺, which is associated with the pinyin initial 'sh-'. After completing the initial juncture, the user enters the syllable selection juncture.

At the syllable selection juncture, each selection cell is associated with a vowel cluster. The selection cells display all existing Mandarin syllables which begin with the previously selected initial and the associated vowel cluster. The syllable "shi" is displayed in the selection cell associating the chord ○○❸○○ with the '-i' and '-er' vowel clusters. To demonstrate what is meant by "display existing syllables", note that for the vowel cluster '-ue-' there is no "shueng" in Mandarin but there are syllables pronounced "shui" and "shun", so these are displayed in the selection cell associating the chord ❶○○❹○ with the vowel cluster '-ue-'. Note also that there is no Mandarin syllable "shiou" or "shiong", so the selection cell associating the chord ○❷❸○❺ with the vowel cluster '-iou-' is empty. At the syllable selection juncture, the user may be choosing as many as three different syllables, depending on the finals which follow the initial and vowel cluster. These are narrowed down to one in the pinyin selection juncture.

At the pinyin selection juncture, each selection cell is associated with a combination of final and tone. The selection cells display all existing pinyin based on the previously selected syllable set. The columns in grids at this juncture are associated with finals and the rows are associated with tones. To enhance locatability, the second, third and fourth columns are used (enabling the user to start a left-to-right visual scan immediately after the name block) rather than the first, second and third. The first final is 'ø' (indicating that there is no final) followed by '-n' and '-ng'. The first through fourth tones are taken in order, followed by an "any tone" option (in case the tone is unknown), and then the neutral tone (which is rarely the only tone of a hanzi). The pinyin "s h i" is displayed in the second column (associated with the '-o' final), and the fourth row (associated with the fourth tone). The chord for this combination of final and tone is ○❷❸○❺. Once the pinyin is selected, its hanzi are displayed at the hanzi juncture.

Even if the hanzi carries no tone in the context in which it is being input, it will usually have an additional, and primary, toned pronunciation, which will often be used to locate it in CHIME. For instance the hanzi "I suppose" used at the end of sentences is pronounced with both neutral and first tone and so may be located in grids selected with first, any, or neutral tone.

At the hanzi selection juncture, each selection cell is associated with a single hanzi pronounced with the previously selected pinyin. As many as possible are displayed in the OHAI window. If there are more than thirty hanzi, twenty nine are displayed and the chord ❶❷❸❹○ causes the OHAI window to display the remaining hanzi (this is the second hanzi juncture). When the user chords for one of these, OHAI sends the hanzi to the current user application window and returns to the initial screen to wait for another hanzi to be selected.

All pinyin are selected using a sequence of at most three chords: the first chord in the sequence selects an initial, the second chord selects a vowel cluster, the third selects the tone and final. At each juncture in the sequence, a chord always selects the same choice for that part of the pinyin: for example, the ○❷○○❺ chord at the first juncture of the sequence always selects the initial 'I-', at the second juncture always selects the vowel cluster '-i-' (provided it exists for the previously selected initial), and at the third juncture always selects for the third tone with no final (also providing they exist for the previously chorded initial and vowel cluster). Only those pinyin syllables which exist and combine initial, vowel, final and tone are shown as the third chord choices.

FIG. 23 has a table showing which chords select which pinyin components at each of the three junctures in the pinyin selection process. Once a pinyin is selected, the hanzi for it are always presented in the order of the number of strokes required to produce the hanzi with pen and paper (a very familiar organizing principle easily used by anyone familiar with hanzi). This takes advantage of a tendency for the most commonly used hanzi to be those with fewest strokes, and also those which are most easily identified, thus speeding locatability.

EXAMPLES

Because very few pinyin have more than thirty hanzi, approximately 99% of hanzi are selected in four or fewer chords. 95% are selectable in exactly four chords, 4% require less than four chords, and 1% require five chords. Since no pinyin has more than fifty nine hanzi, none requires more than five chords. Examples of hanzi selectable in four, five, two and three chords follow.

Typical Hanzi is Four Chords

Four chords are sufficient to send well over 95% of all hanzi to user applications. FIG. 24 illustrates the four chord sequence needed to input 是 ("shi"). Starting at the base grid, the user chords ○❷❸❹❺ to select the initial 'sh-'. When this initial is selected, the second grid, which shows all syllables starting with the initial 'sh-', allows the user to select the syllable 'shi' with the chord ○○❸○○. The resulting third grid allows the user to select the complete pinyin with the ○❷❸○❺ chord. The fourth grid displays the first twenty nine of the forty two hanzi pronounced s h i; the user then chords 是 to select 是 sending it to the user application and causing the OHAI window to display the base grid again in preparation for the next hanzi.

The chord sequence ○❷❸❹❺ ○○❸○○ ○❷❸○❺ 是 is all that is necessary to send the hanzi 是 ("shi") to a user application such as a word processor or spreadsheet. Note that four chords are less than the number of strokes (nine) required to produce the hanzi on paper.

Examples for Five Chord Hanzi

In those cases where there are more than thirty hanzi for a pinyin, the first twenty nine are displayed at the fourth juncture and those thirty and greater are displayed in a fifth. The hanzi 誓 (shi4, "vow or pledge"), indicated by 31 in FIG. 18, is an example. The ellipsis in FIG. 25 indicates that there are more than thirty hanzi pronounced "s h i". To access these, the user first uses the same first three chords (O●●●○ OO●O● O●●O●) as 是 and then, at the first hanzi juncture, chords ●●●●O to access the fifth chord map. Finally O●O●● chords 貫. Here, the five chords ( O●●●● OO●O● O●●O● ●●●●O O●O●●)
are less than the fourteen strokes required to hand-write the hanzi. Other pinyin for which there are 5 chord hanzi are:
  yi4, yu4, bi4, li4, zhi4, ji1, ji4, xi1
  Example for Two Chord Hanzi
If there is only one hanzi that exists for a particular initial and a vowel cluster, then that hanzi is displayed at the syllable selection juncture, allowing the user to select it in only two chords. FIG. 26 shows the CHIME grids and chording sequence for inputting the hanzi 給 (gei3 "give") in only two chords. Starting at the CHIME base grid, the user chords ●OOO● to select the initial 'g-'. Since gei3 is the only pinyin with the initial 'g-' and the vowel cluster '-ei-', and 給 is the only hanzi for this pinyin, 給 is displayed in the grid block associated with the vowel cluster '-ei-'. The user chords ●O●●O to select it. Two chords (●OOO● ●O●●O) compare very favorably with the twelve strokes for 給. Some other hanzi that are selected in two chords, and the number of strokes necessary to produce them, are shown in FIG. 27.

FIG. 22 can be used to determine which sequences of two chords input each of these.

Examples for Three Chord Hanzi

If there is only one hanzi for a particular pinyin, but there are other pinyin that begin with its initial and vowel cluster, then that hanzi will be displayed at the hanzi selection juncture, allowing the user to select it in only three chords. FIG. 28 shows the CHIME grids and chording sequence for inputting the hanzi (掰 bai1 "pinch off") in only three chords. Starting at the CHIME base grid, the user chords OOO●O to select the initial 'b-' and then OO●O● to select the syllable 'bai'.

Since bai1 has only one hanzi, it is displayed in the grid block associated with the first tone and no final. The user chord OOOO● to select it. The three chords (OOO●O OO●O● OOOO●) here compare favorably with the twelve strokes necessary to write 掰. Other three chord hanzi and stroke counts are as shown in FIG. 29.

FIG. 22 can be used to determine which sequences of three chords input each of these.

The Design of CHIME

CHIME's sine qua non is to enable hanzi input. If it is to become commercially viable, equally important is that it minimize user effort in the process. No less desirable, but of secondary importance, is that it provides means for customization of other input functions. This section presents an overview of CHIME's user effort minimization, enumerates some of the optimizations that contribute to CHIME's efficiency, and then shows how CHIME can be customized.

Minimizing Effort

CHIME minimizes both long term and day-to-day user effort.

Long Term User Effort Minimization

CHIME minimizes long term user effort through a self-teaching design which diminishes the necessity to look at the OHAI window over time. This self-teaching is achieved by consistency of both sequence and choice; i.e., the same choice at the same juncture in the process always produces the same result. Combining sequence and choice minimization with consistency enables the user to memorize chord/input associations by using them, not through any special effort. The result is that the user capitalizes on his day-to-day effort: in a small amount of time, he no longer has to look at the OHAI window to select pinyin; and in an only slightly longer amount of time he does not have to look at the window for the hanzi he uses most.

Day-to-Day User Effort Minimization

Day-to-day effort minimization means less effort is needed to produce hanzi with CHIME than with any other method, including writing. This is achieved through the basic design of CHIME, which accomplishes the following:

1. Minimization of the number of steps in the chording sequence to produce a hanzi.
2. Minimization of the number of choices necessary at each step in the chording sequence.
3. Utilization of an order among the choices at each step that facilitates location of the desired input or sub-input.

These qualities of CHIME are accomplished by optimizations listed hereafter.

Optimizations

If CHIME were to simply enable the user to select one pinyin letter after another, and then select from the hanzi for that syllable, it would take only slightly less effort than keyboard-based methods. CHIME makes a number of optimizations that enhance its suitability to the task of Chinese input.

Mutually Exclusive Initials, SemiVowels, and Vowel Clusters

Combining choices wherever possible is an optimization which frees chords, and thus allows them to be used for other purposes. Note that there are twenty one initial consonants, which together with the option not to have an initial consonant, gives twenty two choices for starting a pinyin. Even though the twenty two choices fit comfortably within the thirty one selection cells in an OHAI grid, it is desirable to take up as few as possible, especially in the base grid, in order to leave the remainder free for other uses. Observations about Mandarin syllables (FIG. 16) enable us to free up three chord blocks for the base (initial selection) grid, and one chord block in the second (vowel selection) grid.

The first observation concerns two groups of initials: (j, q, x) and (z, c, s). The initials (j, q, x) are mutually exclusive with (z, c, s) in what follows them; (j, q, x) precede the long i and the umlaut ü; (z, c, s) precede the short -i, a, e, o, and u. This can be seen graphically in the greyed areas in FIG. 16. These gaps and the phonetic similarity of the pairs (j, z), (q, c) and (x, s) allow CHIME to combine the pairs/columns and thus decrease by three the number of chords for the initial consonant choice.

There are three mutually exclusive ways to represent syllables which do not start with a consonant. For vowel clusters starting with 'a', 'o', or 'e', the syllable starts with the vowel. For vowel clusters starting with 'i', the pinyin system substitutes 'y'. For vowel clusters starting with 'u', the pinyin system substitutes 'w'. These three mutually exclusive choices are combined in the selection cell associating the chord OOOO● with the absence of an initial consonant.

A similar observation allows CHIME to free a chord block in the vowel selection phase: Short '-i' never occurs without a preceding consonant and '-er' never occurs with one, so the same second chord can select both. FIG. 21 is the result of making these collapses in the Mandarin syllable chart in FIG. 16.

Initials & Vowel Clusters Rather than Letters

Selecting sequences of sub-inputs rather than individual sub-inputs wherever possible is an optimization which reduces junctures thus enabling faster input. In CHIME this optimization manifests as the ability to select two-letter initials (e.g. 'sh-'), entire vowel clusters (e.g. '-iao'), and tone and final in one chord. The alternative, in this case selecting one letter at a time, is possible with OHAI, but choosing this and other optimizations enables CHIME to improve upon previous methods in terms of usability and speed.

Using this strategy, each CHIME juncture saves user effort: the base juncture saves as many as one chord through the inclusion of two-letter initials in the base grid; the syllable juncture saves as many as two chords through the presentation of all Mandarin vowel clusters; The pinyin juncture saves as many as two chords through combining tone and final. Since the user needs fewer chords to produce a hanzi, the input process is speeded up.

Minimization of Choices at each Juncture

Memorizability is enhanced by minimizing the total number of chord/input associations, the total number of junctures, and the number of associations within each juncture. FIG. 23 shows that the number of associations at the base juncture is twenty four, the number of associations at the syllable juncture is twenty one, at the pinyin juncture, eighteen. Thus sixty four facts are memorized to produce one thousand two hundred and seventy nine pinyin. This number allows the whole pinyin selection process to be memorized much more easily.

Consistency of Choices at each Juncture

When the user looks at the OHAI window, he always sees the same choices in the same place at each juncture. This enhances locatability by ultimately eliminating the necessity to scan at each juncture. As the sixty four associations of chord with pinyin part become familiar, the user's eye gets trained to look at the selection cell directly. This contributes to speeding the input selection process.

Any tones Selectability

Sometimes native speakers are not sure of the tone for a particular pinyin, so CHIME includes an "any tone" option at the pinyin juncture. When this selection is chorded, all hanzi for all tones are displayed in as many subsequent grids as necessary to accommodate them. FIG. 30 shows the grids displayed after selecting the any tone option for "shi". The grids display all hanzi in all tones for the syllable "shi" and are arranged in stroke count order. The any tone grids are the sole exception to no hanzi requiring more than five chords.

Preview of Next Grid

FIG. 28 shows a grid that is a mix of pinyin and hanzi. When there are four or fewer hanzi associated with a particular pinyin, CHIME displays them instead of the pinyin. This has the advantage of indicating which hanzi will appear on the next grid and in which order. If the hanzi is used often, its position in the chord block at the previous juncture comes to indicate the required chord without having to look at the next grid.

Changed Mind Optimizations

Since there are many free selection cells in each of the first three junctures, CHIME allows SPACE, 0–9, PUNCT, and CANCEL in them all so that the user can at any point in the pinyin selection process enter a space, number, math symbol, punctuation, or go back to the base grid. This means the user does not have to go back to the base grid if he changes his mind while in the process of selecting a pinyin.

Display Only What Exists

So not to distract the user, at each juncture in the Chinese text input process, CHIME displays only those syllables, pinyin, and hanzi that exist, and not those which may exist (for instance, as a result of combining the selected initial with all of the vowel clusters in the second grid, or a selected syllable with all possible tones), this minimizes visual distraction thus enabling the user to more quickly locate selections.

Intuitive Selection Cell Contents

Locating inputs and sub inputs is facilitated by displaying selection cell contents which tell the user as much as possible as clearly as possible what will happen when the chord associated with the selection cell is chorded. In chording, the sequence of selection cells is "sh", "shi", then "s h i", rather than "sh", "-i", then "ø(4)", which are the actual meaning of the chords. The user thus sees what he expects to input rather than it's bits and pieces.

Customizability Example

The presentation of a minimal number of choices, especially for the first and last sequential chords, dovetails with customization goals of CHIME. Examples of customization functions are: user defined symbols, selection of pinyin input instead of hanzi, and selecting multi-hanzi phrases which begin with the selected hanzi. Customization entry points are inserted at the first and last junctures in CHIME; between these junctures, the user is in the process of selecting a hanzi, which must either not have started or be complete before customization functions are appropriate.

Figure 31:
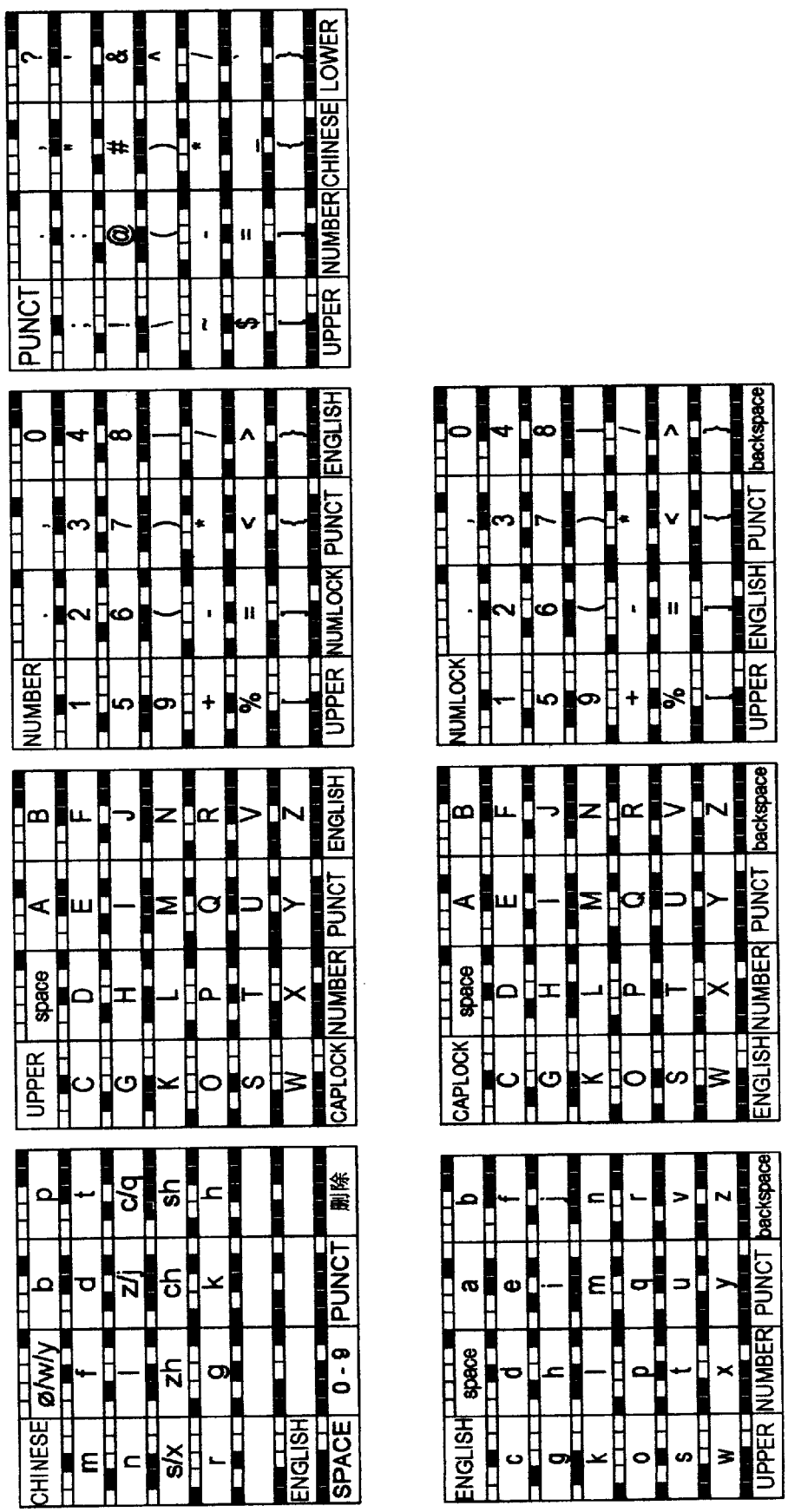
FIG. 31 illustrates the integration of CHIME and OTIS.

One kind of customization, extensibility, consists of enabling the user to do something other than selecting a pinyin initial at the first CHIME grid. This is achieved by using free grid blocks for the extension functionality. If, for instance, the user wanted to be able to switch between Chinese and English input, he could integrate OTIS into CHIME by using one of the first juncture selection cells to select OTIS, and a free OTIS selection cell to return to CHIME. One scheme for this is given in FIG. 31.

For user convenience each OHAI gridset applications base grid is relabeled with the name of the language input. To complete the integration, all that is needed is a way to start OTIS from CHIME and a way to start CHIME from OTIS. To make OTIS accessible from CHIME, all that is needed is to use one of the free chord blocks in the base grid to reference the base grid of OTIS. To make CHIME accessible from OTIS is a little trickier because all of the cells are used. In fact, there is only one free cell in all the OTIS grids. Not wanting to do a lot of rearranging, and accepting the necessity to chord into the PUNCT grid in order to access CHIME we use this free cell to reference CHIME's base grid. So, to start OTIS from CHIME the user chords ❶❷○○○. And to return to CHIME from OTIS, he chords ❶❷❸❹○ ❶❷❸❹○. Both of these are easily remembered.

Advantages of CHIME Over Keyboard-Based Methods

TwinBridge displays only ten hanzi at a time and forces the user to use keystrokes to swap out other sets of ten which takes time. CHIME displays all of the available hanzi in one of two grids. Since the OHAI handset is used, and the OHAI window occupies the same display as the application window, the user does less visual focus switching. The user does not have to backtrack through prompt screens. For only 1% of hanzi is it possible to miss on the first pass.

Other uses of CHIME

The interface for selecting hanzi for input can be used for other applications. One example of an application that uses the same interface is a Chinese dictionary. Instead of sending input, the dictionary application can display a definition of the selected character. Another possible use is as a teaching and translation aid: for non-fluent speakers of these languages, the same software can inform the user of the meaning of a selected hanzi. In lookup mode, OHAI displays translations for the chorded hanzi, and only sends the hanzi to the user application window if the chord is re-selected.

TECHNICAL: UNDER THE HOOD OF OHAI

OHAI Hardware and Firmware

The WOH is one example of the OHAI hardware. OHAI hardware can take any form as long as it sends chord information to the OHAI software. OHAI Firmware is a program that resides on the chip in the hardware that translates chord presses into interpretable signals and sends them to the OHAI software on the user's computer.

Firmware Description

Figure 33:
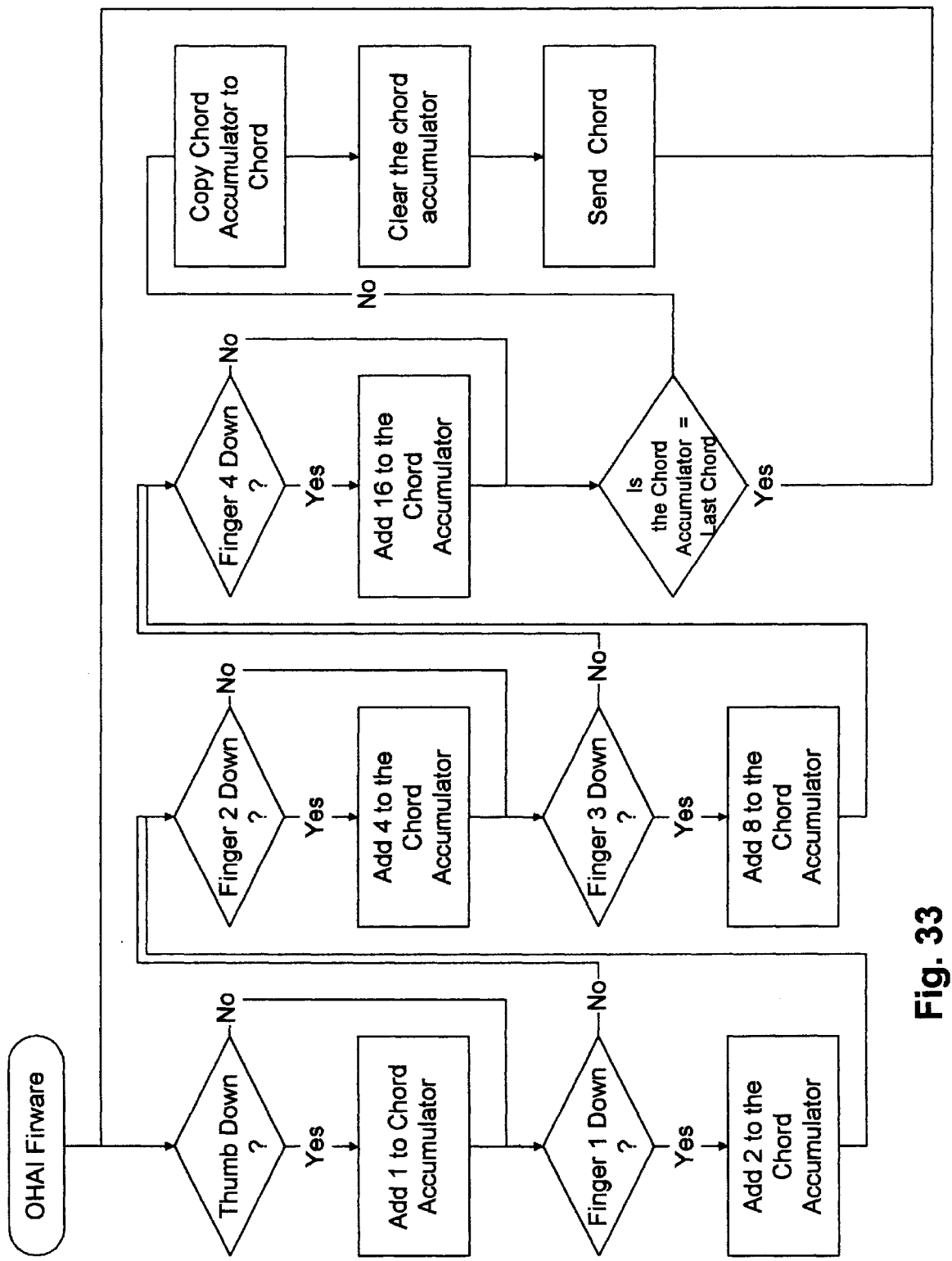
FIG. 33 is an OHAI firmware flowchart.

All the firmware does is monitor the state of five switch inputs corresponding to the fingers holding the OHAI device. When the aggregate state of these five inputs changes, the firmware causes the device to send the corresponding chord to the computer on which the OHAI software resides. FIG. 33 is a flowchart showing one method of implementing the firmware. Note that this design guarantees that no duplicate chords are sent in sequence, and that one and only one NULL chord is sent when a chord is a completely released.

The flowchart in FIG. 33 implements the expression $$16(F_4)+8(F_3)+4(F_2)+2(F_1)+T$$

where F is a finger press and T is the thumb press (Lower F, is closer to the thumb). This expression ensures that the integer associated with a chord is unique for each combination of finger presses.

The Chord Accumulator, as shown in FIG. 33, is used so that the "Send Chord" procedure only sends chords that are complete.

Hardware Forms

In a user environment where both right and left hand users use the same computer, it is advisable to have a form of the OHAI device that can be used easily in either hand. A device which meets these requirements is shown in FIG. 39.

Figure 39:
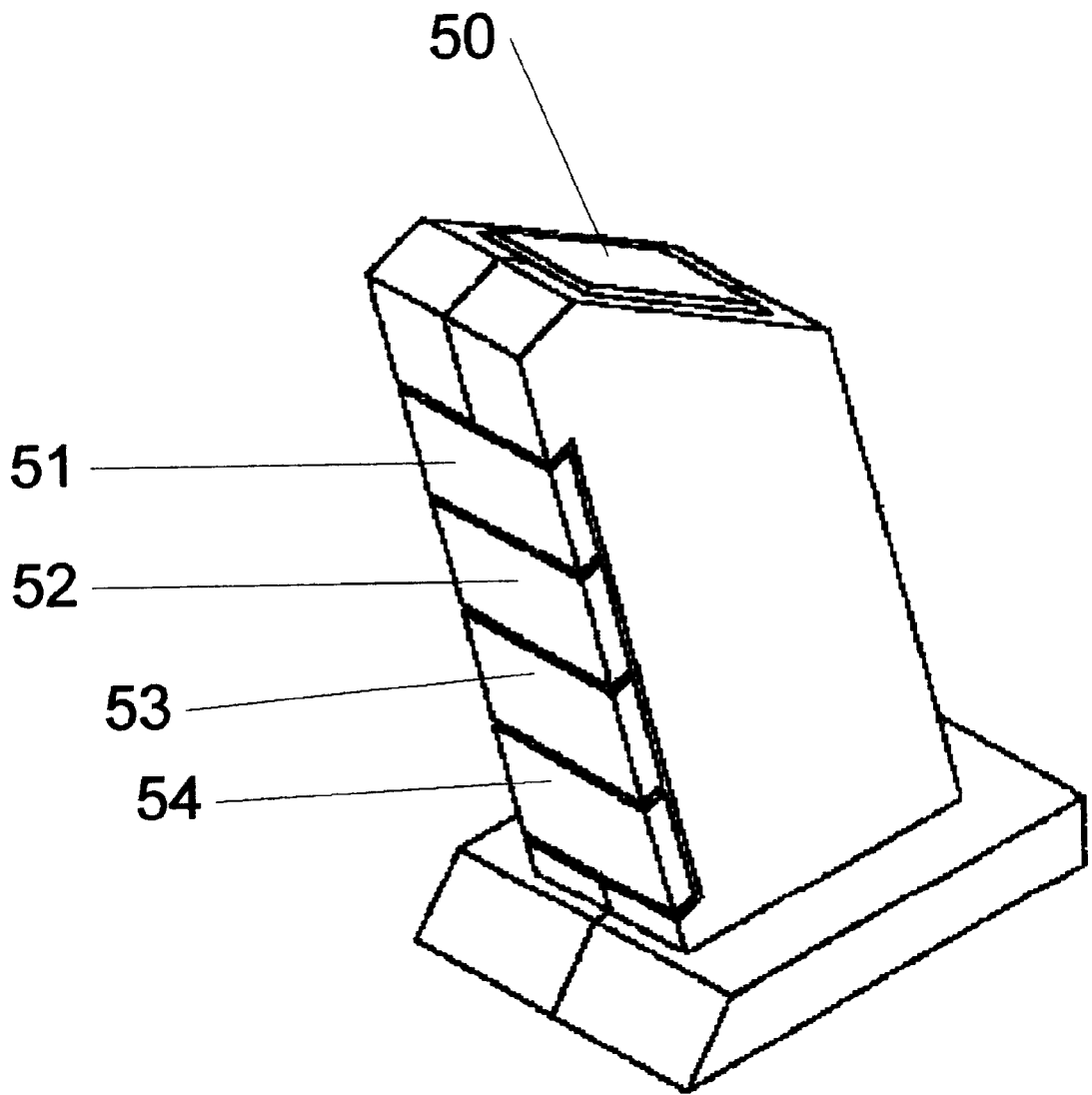
FIG. 39 shows a joystick-type OHAI handset.
Figure 40:
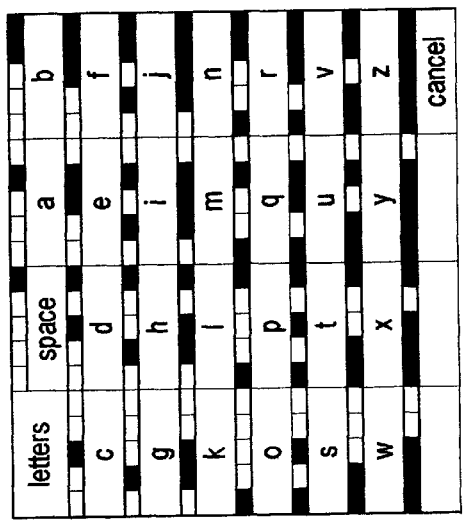
FIG. 40 shows chords and corresponding letters for non-display applications.

The workstation OHAI handset illustrated in FIG. 39 resembles a joystick and has a base and a key carrier extending from the base. The key carrier includes a top surface having a single pushbutton switch 50 which is depressible by a thumb of a user, and a set of four pushbutton switches 51,52,53,54 extending along a front surface of the carrier facing away from the user. The siting of these pushbutton switches enables the device to be grasped and used by a right hand or a left hand.

The simplicity of requirements for the OHAI hardware make possible a plethora of designs, each suitable to its particular user environment or user preferences. For instance, one of the criteria which define user environments is the degree of mobility required. A moderately mobile user uses a laptop. A very mobile user requires a very small computer that can be set up and taken down in very short periods of time; wearable or palmtop computers are suited to this environment.

A form of the OHAI device suitable for laptops is shown in FIG. 35 and FIG. 36. The OHAI laptop device consists of one or two sets of five buttons 40,41 and 43,44 ergonomically placed on the housing of a laptop computer. Although either set of buttons would serve, having two allows the user to alternate between them to eliminate hand fatigue caused by too much time in the same position. Similar button configurations can be placed on armtop, palmtop and wearable computers.

In FIGS. 35 and 36, button 43 is the topmost of a set of buttons for use by a left hand on the monitor portion of the laptop computer. Button 43 is for the thumb of the left hand. Buttons 44 are for use by the fingers.

A set of buttons 40 and 41 are the thumb and finger buttons respectively ergonomically and alternatively located on the laptop. The little finger depresses the leftmost button 45.

For maximum comfort, the user can use either the front set (40,41) or the back set (43,44) of buttons at any time.

Figure 37:
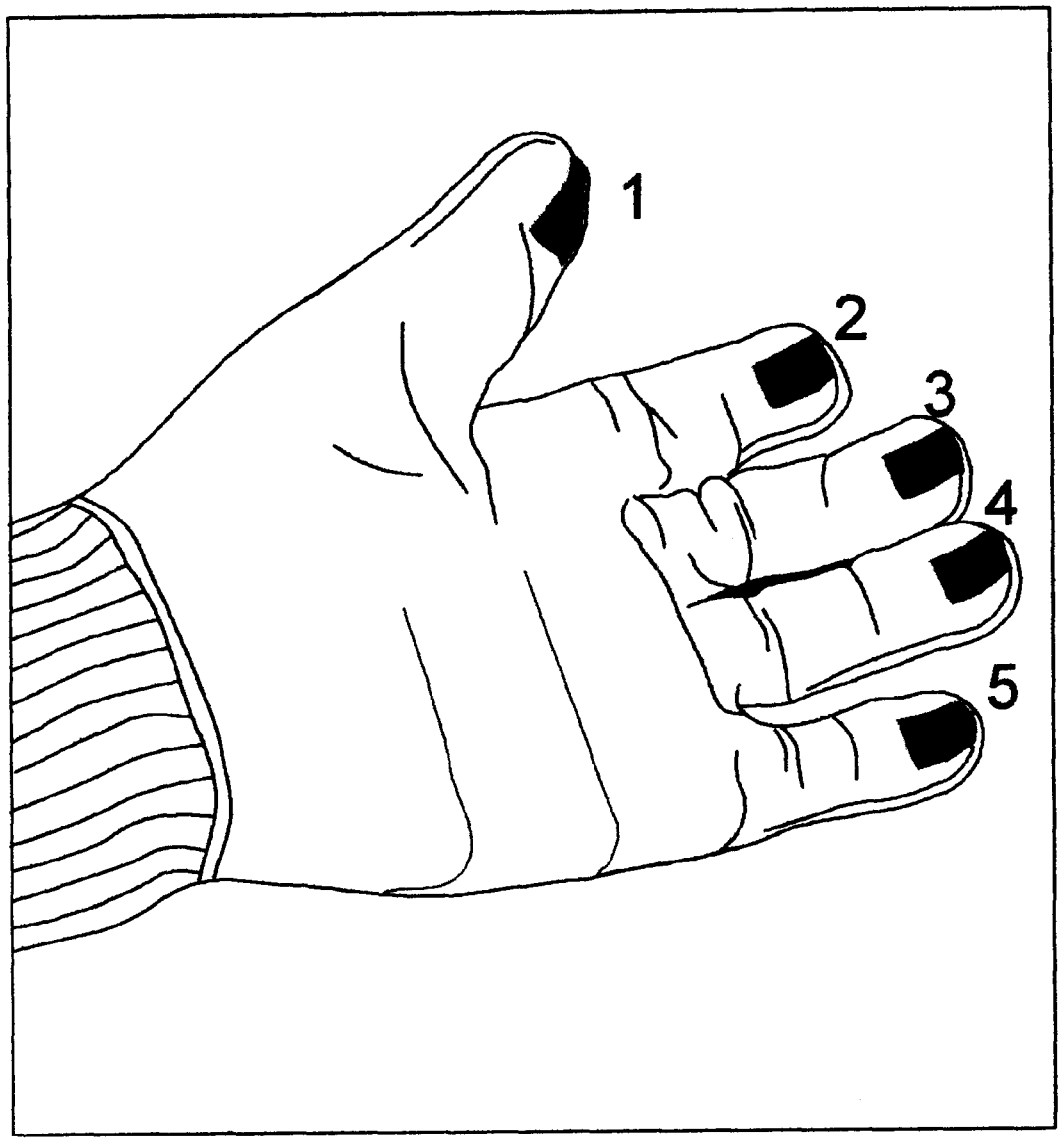
FIG. 37 shows an OHAI Glove for a left hand.
Figure 38:
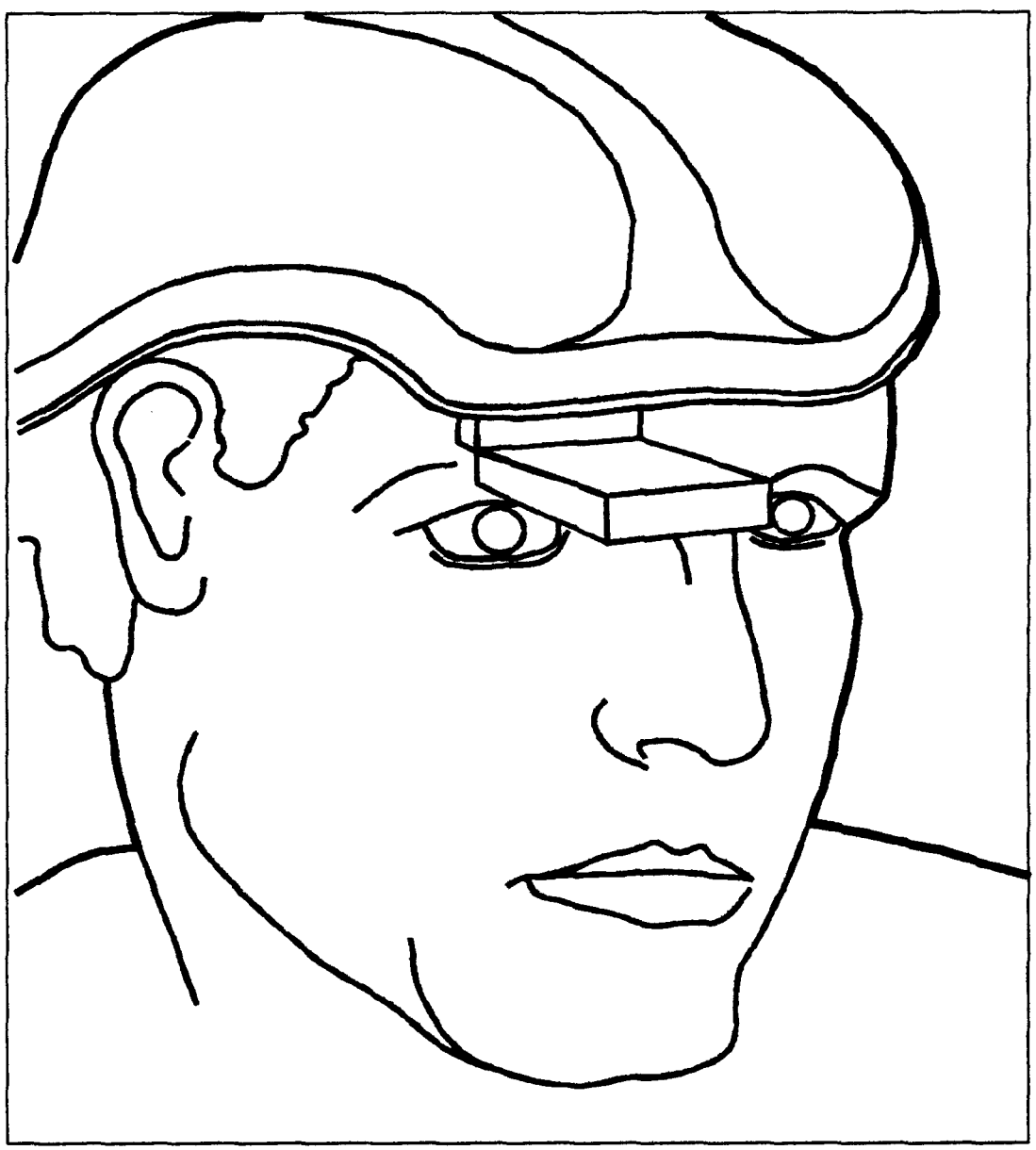
FIG. 38 illustrates a headset for use with wearable computer.

The OHAI Glove (FIG. 37) is a suitable version of the OHAI device for wearable (especially military field-use) computers. It consists of five sensors integrated into the finger tips of a glove, the OHAI firmware and a method for sending chords to a wearable computer when the fingers are pressed. If the wearable computer has a headset (FIG. 38), the interaction of the glove and the OHAI software and the OHAI window in the headset display is identical to the interaction of the WOH, the OHAI software, and a monitor screen.

FIG. 39 shows an example of chords corresponding to letter for use with non-display applications.

Figure 41:
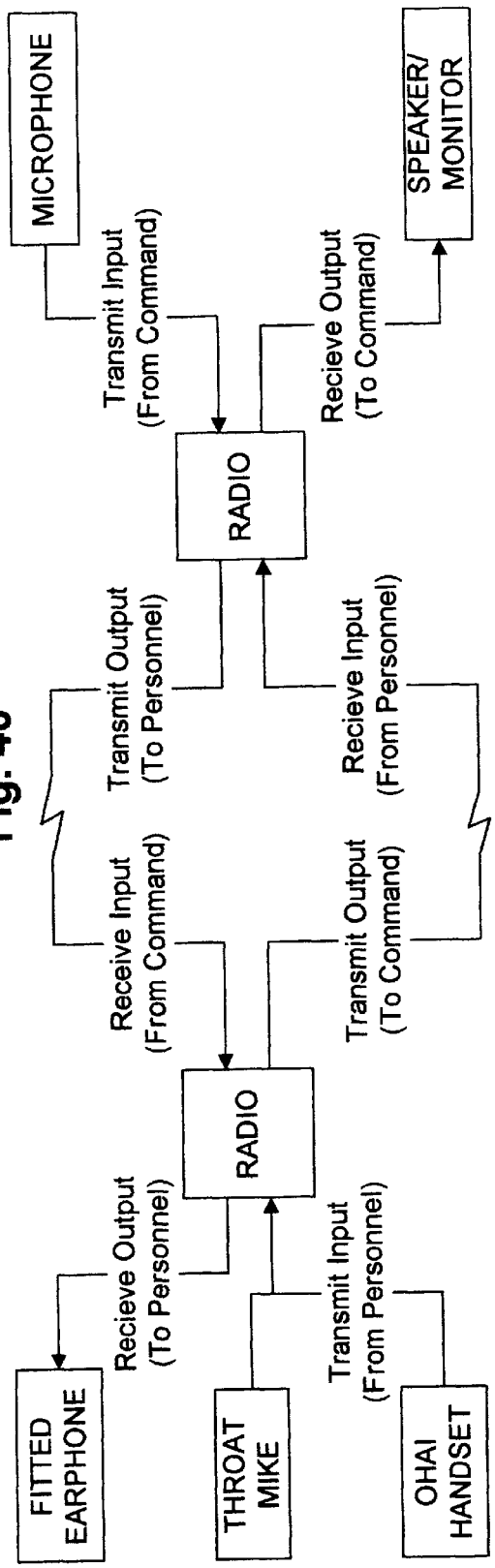
FIG. 41 is a schema for a secure silent communications OHAI application.

There is a specialized OHAI interface for audio/vocal interfaces such as might be used in military field applications requiring secure silent communications. In these cases the computer is connected to a radio or other means of communication. Since silent communication is required, FIG. 41 gives a schema for such secure silent communication.

IMPLEMENTING OHAI APPLICATION TYPES

All OHAI applications include software which receives chording information from the OHAI hardware. The software is different for each of the three types of OHAI applications.

OHAI Gridset Applications

CHIME and OTIS are examples of OHAI gridset applications.

Since there are many different OHAI gridset applications, and they are modifiable by the user, the complexity is managed in data files. Since the data files are separate from the OHAI software, they can be changed without any danger of breaking OHAI. Each of these will be described in sufficient detail that a reasonably competent programmer can implement the entire system'. There are so many ways to optimize the system that these are left up to individual implementers. Rather than present a comprehensive theory of implementation, we make extensive use of OTIS as an example. Since the data files determine what OHAI does, this section starts with a description of an OHAI gridset application file.

DATA FILES FOR OHAI GRIDSET APPLICATIONS

Overview of OHAI Gridset Application Files

OHAI gridset application behavior is completely specified by ORAI gridset application files. OHAI gridset application files contain information which specifies the selection cell contents, the user application input and the selection cell successor grids.

For instance, the OTIS base grid (FIG. 5) selection cell for the chord displays "space", causes a space character (ASCII 32) to be sent to the User Application, and has the base grid itself as a successor.

Organization of the OHAI Gridset Application File

FIG. 32 shows the structure of the file for the OTIS OHAI gridset application. The file consists of entries for each selection cell. Each entry consists of three fields; the fields are named display, input and successor.

The display field indicates what is displayed in the selection cell.

The input field indicates what is sent to user applications.

The successor field indicates the successor grid.

The NULL constant is used to indicate nothing is displayed if it is in the display field, that nothing is sent to the user application if it is in the input field. For inputs that cannot be displayed, such as space and backspace, a backslash (\) is used to precede the corresponding ASCII code. If backslash is the input, two backslashes are used as the input field. There is always a name of a grid in the successor field. There are thirty two sequentially arranged entries for every grid in an OHAI application. The grid field always refers to one of these grid groups.

An Implementation of OHAI Gridset Application Files

One way of implementing OHAI gridset application files is to use tabs to delimit the fields in each entry and carriage returns to delimit entries. Using this implementation, lines of the OTIS file would look like the following:

| LOWER | NULL | NULL |
|-------|------|------|
| space | \032 | LOWER |
| a | a | LOWER |
| b | b | LOWER |
| ... | | |
| UPPER | NULL | NULL |
| Space | \032 | LOWER |
| A | A | LOWER |
| B | B | LOWER |
| ... | | |

The file has 192 lines and the 32 lines for each grid group are arranged so that the first entry is for the title block, the second entry is for the first chord (OOOO●), the third entry is for the second chord (OOO●O), etc. For all but the base grid, which must be first, the grid groups can be in any order.

THE OHAI SOFTWARE FOR OHAI GRIDSET APPLICATIONS

Figure 34:
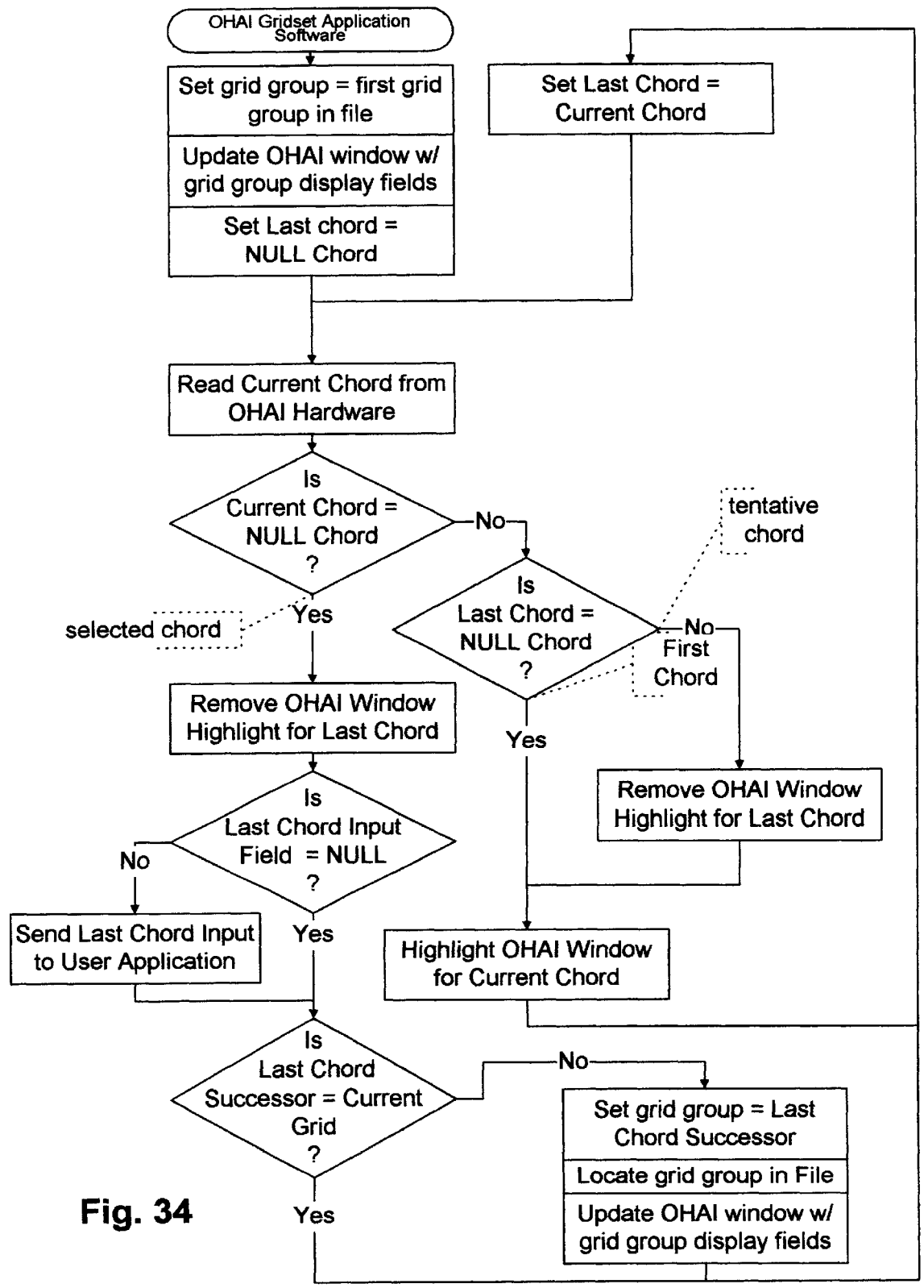
FIG. 34 is an OHAI Gridset application flowchart.

FIG. 34 is a flowchart showing how the OHAI software uses OHAI gridset application data files to process input from the OHAI hardware to send inputs to user applications. It might be helpful to think of the output of the OHAI software as the input to user applications.

The first thing the software has to do is bring up the contents of the OHAI window. The initial contents is determined by the first grid group in the file. All of the display fields in the first grid group entries are displayed in the OHAI window top-to-bottom and left-to-right so that the sequence in the file matches the sequence in the window.

After initializing the OHAI Window, the OHAI software sets a variable that keeps track of the second most recent (the "last" chord) chord received from the OHAI device to the NULL chord.

Once these initializations are complete, the main loop of the software is entered. The first thing that the loop does is wait for a chord to be received from the device. Once it receives a chord into a variable that keeps track of the most recent chord (the current" chord) there are three possibilities:

1. The current is chord is the NULL chord
2. The current chord is not NULL and the last chord is NULL
3. The current chord is not NULL and the last chord is not NULL Case (1) corresponds to the user pressing and releasing a chord. Since the firmware cannot send two instances of the same chord in a sequence and sends the NULL chord when all switches are released, case (1) can only occur if the last chord was not NULL. This means that the user pressed and released a chord thus selecting it; this pressed chord was recorded as the last chord and releasing it caused the current chord to become NULL. The first action the software takes to process a selected chord is to remove the highlight for the last chord (it is no longer tentative). After removing the highlight, any input associated with the chord is sent to the user application (the input field is not NULL). If the successor grid for the selected chord/input is different from the current grid, the current grid is set to the successor, it is located in the file, and the OHAI window updated for it. After processing the chord's display, input, and successor grid, the software overwrites the last chord with the current chord so processing can resume again by waiting for a chord from the device.

If the current chord is not NULL (cases 2 and 3), that means that the user is either starting or in the midst of a sequence of tentative chords.

Case (2) corresponds to a user pressing a chord but not releasing it after having already released the previous chord. In case (2), the last chord received from the device was NULL indicating that the last chord was completely processed (or that this is the very first chord received by the software); this means that the current chord is the first (and possibly last) in a sequence of tentative chords. The only thing that the software does for the first tentative selection is highlight the selection cell for the chord in the OHAI window. After updating the OHAI window, the software overwrites the last chord with the current chord so processing can resume again by waiting for a chord from the device.

Case (3) corresponds to the user pressing a chord after a different chord with no intervening release. This is the case when he changes his mind, or when he presses one finger at a time to complete a chord before releasing; each time he adds a finger is a different tentative chord. With each change, the software removes the highlight for the last chord and highlights the selection cell for the current chord. After updating the OHAI window, the software overwrites the last chord with the current chord so processing can resume again by waiting for a chord from the device. The loop which processes chords continues indefinitely.

While the invention has been described with reference to specific embodiments, modifications and variations of the invention may be constructed without departing from the scope of the invention, which is defined in the following claims.

I claim:

1. An interface system for inputting a pictographic language to a receiving means based pronunciation of said pictographic language wherein said pronunciation is expressed as one syllable per pictograph and further wherein multiple pictographs exist for each syllable of said pictographic language, comprising:

input means with switches for each digit of the hands:

an interactive display means having a plurality of blocks each containing a corresponding chord map with the remaining area in the block representing user input choices which include one or more members of the group: (a) initial sound clusters consisting of vowel initials multi-symbol initials complementary initials, semivowel initials, (b) interior vowel clusters, (c) a member of the group consisting of final sound clusters being presented as one element and tone sounds, and combinations thereof; causing a plurality of pictographs to be generated;

actuation means in communication with said interactive display, for actuating a signal generator when said plurality of pictographs are generated; and a signal generator in communication with said actuation means for producing signals which correspond to the selected pictograph.

2. The system of claim 1, wherein said interactive display is selected from the group: grid on a computer display, overlay on a computer display, grid on a wearable display, overlay on a wearable display, computer monitor and combinations thereof.

3. The system of claim 1, wherein said actuation means is selected from the group: a keyboard, a joystick, a mouse, a touch screen, a voice input system, a chordal input device, a data glove, and combinations thereof.

4. The system of claim 1, wherein said signal generator is in communication with a receiver selected from the group: another interactive display, a computer chip, a software program and combinations thereof.

5. The system of claim 1, wherein the pictographic language is selected from the group comprising: Chinese, Japanese, Korean languages and dialects thereof and combinations thereof.

6. The system of claim 1, wherein said multi-symbol initials is selected from the group comprising: "sh", "ch", and "zh".

7. The system of claim 1, wherein said complementary initials are selected from the group comprising: "z and j", "z and zh", "j and zh", "c and q", "c and ch", "q and ch", "s and x", "s and sh", and "x and sh".

8. The system of claim 1, wherein said final sounds are selected from the group comprising: "Ø", "n", and "ng".

9. The system of claim 1, wherein said tones are selected from the group comprising: a low tone, a high tone, a rising tone, a falling tone, a neutral tone, Mandarin first tone, Mandarin second tone, Mandarin third tone, Mandarin fourth tone, Mandarin Neutral tone.

10. An interface system for inputting a pictographic language to a receiving means based on pronunciation of said pictographic language wherein said pronunciation is expressed as one syllable per pictograph and further wherein multiple pictographs exist for each syllable of said pictographic language, comprising:

input means with switches for each digit of the hands;

an interactive display means having a plurality of blocks each containing a corresponding chord map with the remaining area in the block representing user input choices for the interior vowel cluster selected from the group consisting of sequences of vowels, semivowels, and combinations thereof with each said interior vowel cluster being presented as one element;

actuation means in communication with said interactive display, for actuating a signal generator when said element is selected; and a signal generator in communication with said actuation means for producing said signals which correspond to the element selected.

11. The system of claim 10, wherein said interactive display is selected from the group: grid on a computer display, overlay on a computer display, grid on a wearable display, overlay on a wearable display, computer monitor and combinations thereof.

12. The system of claim 10, wherein said actuation means is selected from the group: a keyboard, a joystick, a mouse, a voice input system, a chordal input device, a data glove, and combinations thereof.

13. The system of claim 10, wherein said signal generator is in communication with a receiver selected from the group; another interactive display, a computer chip, a software program and combinations thereof.

14. The system of claim 10, wherein the pictographic language is selected from the group comprising: Chinese, Japanese, Korean languages and dialects thereof and combinations thereof.

15. The system of claim 10, wherein said interior vowel cluster is a member of the group consisting of vowels, semivowels, and combinations thereof selected from the group comprising combinations of any two or more of the following: "a", "e", "i", "o", "u", "ü", "y", and 'w".

16. An interface system for inputting a pictographic language to a receiving means based on pronunciation of said pictographic language wherein said pronunciation is expressed as one syllable per pictograph and further wherein multiple pictographs exist for each syllable of said pictographic language, comprising:

input means with switches for each digit of the hands;

an interactive display means having a plurality of blocks each containing a corresponding chord map with the remaining area in the block representing user input choices which overlays chord maps on an existing display to facilitate usage with chordal input means;

actuation means in communication with said interactive display, for actuating a signal generator when said element is selected; and a signal generator in communication with said actuation means for producing said signals which correspond to the selected element.

17. An interface system for inputting a pictographic language to a receiving means based on pronunciation of said pictographic language wherein said pronunciation is expressed as one syllable per pictograph and further wherein multiple pictographs exist for each syllable of said pictographic language, comprising:

input means with switches for each digit of the hand;

an interactive display means having a plurality of blocks each containing a corresponding chord map with the remaining area in the block representing user input choices which presents a grid indicating a plurality of choices and visually indicates a tentative choice through highlighting means;

actuation means in communication with said interactive display, for actuating a signal generator when said element is selected; and a signal generator in communication with said actuation means for producing said signals which correspond to the selected element.

* * * * *